(12) United States Patent
Roeland et al.

(10) Patent No.: US 10,708,828 B2
(45) Date of Patent: Jul. 7, 2020

(54) HANDOVER INITIATED ALIGNMENT OF PENDING INTEREST TABLES

(71) Applicant: Telefonaktiebolaget LM Ericsson (publ), Stockholm (SE)

(72) Inventors: Dinand Roeland, Sollentuna (SE); Hans Eriksson, Sollentuna (SE); Kim Laraqui, Solna (SE); Neiva Lindqvist, Vällingby (SE); Gunnar Mildh, Sollentuna (SE); Ala Nazari, Handen (SE); Börje Ohlman, Bromma (SE); Ioanna Pappa, Stockholm (SE); Johan Rune, Lidingö (SE); Patrik Sellstedt, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 148 days.

(21) Appl. No.: 15/104,099

(22) PCT Filed: May 13, 2016

(86) PCT No.: PCT/EP2016/060883
§ 371 (c)(1),
(2) Date: Jun. 13, 2016

(87) PCT Pub. No.: WO2017/148542
PCT Pub. Date: Sep. 8, 2017

(65) Prior Publication Data
US 2017/0257802 A1    Sep. 7, 2017

Related U.S. Application Data

(60) Provisional application No. 62/301,874, filed on Mar. 1, 2016, provisional application No. 62/301,816, filed on Mar. 1, 2016.

(51) Int. Cl.
*H04W 36/00* (2009.01)
*H04W 88/16* (2009.01)
*H04W 88/02* (2009.01)

(52) U.S. Cl.
CPC ... *H04W 36/0033* (2013.01); *H04W 36/0016* (2013.01); *H04W 88/02* (2013.01); *H04W 88/16* (2013.01)

(58) Field of Classification Search
CPC ......... H04W 36/0016; H04W 36/0033; H04W 88/16; H04W 36/0022; H04W 88/02; H04N 5/3572; H04N 5/3575
(Continued)

(56) References Cited

U.S. PATENT DOCUMENTS 9,191,459 B2    11/2015 Ravindran et al.
2013/0016695 A1*  1/2013 Ravindran ............ H04L 67/327
                                                  370/331
(Continued)

OTHER PUBLICATIONS

Kim, Do-Hyung, "Mobility Support in Content Centric Networks", Information-Centric Networking, ACM 2012 Helsinki, Finland, Aug. 17, 2012, 1-5.
(Continued)

*Primary Examiner* — Omer S Mian
*Assistant Examiner* — Nizam U Ahmed
(74) *Attorney, Agent, or Firm* — Patent Portfolio Builders, PLLC

(57) ABSTRACT

An access node (20) of a cellular network receives an information centric networking request of a user equipment (10) for a data object. The access node forwards the information centric networking request to a local gateway (30) associated with the access node (20). The local gateway (30) maintains a pending interest table including an entry for each data object having a pending information centric networking request at the local gateway (30). In response to the
(Continued)

user equipment (10) moving from a coverage area of the access node (20) to a coverage area of a further access node (21), the access node (20) and the further access node (21) perform a handover procedure. The further access node (21) is associated with a further local gateway (31) maintaining a further pending interest table. The further pending interest table includes an entry for each data object having a pending information centric networking request at the further local gateway (31). The handover procedure initiates alignment of the pending interest table and the further pending interest table with respect to at least one entry associated with the user equipment (10).

44 Claims, 18 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2014/0003348 | A1 | 1/2014 | Velev et al. |
| 2014/0006565 | A1 | 1/2014 | Muscariello et al. |
| 2014/0237085 | A1 | 8/2014 | Park et al. |
| 2014/0269275 | A1 | 9/2014 | Jun et al. |
| 2014/0314093 | A1 | 10/2014 | You et al. |
| 2015/0222479 | A1 | 8/2015 | Kim et al. |
| 2015/0281083 | A1 | 10/2015 | Kim et al. |
| 2015/0296499 | A1 | 10/2015 | Huang et al. |
| 2015/0319204 | A1 | 11/2015 | You et al. |
| 2016/0156737 | A1 | 6/2016 | Perino et al. |
| 2016/0255535 | A1 | 9/2016 | De Foy et al. |
| 2016/0262159 | A1 | 9/2016 | Puddle et al. |
| 2017/0093691 | A1* | 3/2017 | Garcia-Luna-Aceves ................... H04L 45/12 |

OTHER PUBLICATIONS

Lee, Jihoon et al., "Proxy-based Mobility Management Scheme in Mobile Content Centric Networking (CCN) environments", 2011 IEEE International Conference on Consumer Electronics (ICCE), 2011, 595-596.

Liu, Lei et al., "CAMS: Coordinator Assisted Mobility Support for seamless and Bandwidth-Efficient Handover in ICN", 2015 IEEE Globecom Workshops, Dec. 6, 2015, 1-7.

Satria, Triadimas A. et al., "Performance evaluation of ICN/CCN based service migration approach in virtualized LTE systems", 2014 IEEE 3rd International Conference on Cloud Networking (CloudNet), Oct. 8, 2014, 1-7.

Wang, Xiaofei et al., "Cache in the Air: Exploiting Content Caching and Delivery Techniques for 5G Systems", 5G Wireless Communication Systems: Prospects and Challenges IEEE Communications Magazine, Feb. 2014, 131-139.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.2.0, Dec. 2015, 1-290.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.5.0, Dec. 2015, 1-337.

Mosko, M. et al., "CCNx Messages in TLV Format", ICNRG Internet Draft, PARC, Inc., Jan. 11, 2016, 1-36.

Mosko, M. et al., "CCNx Semantics", ICNRG, Internet Draft, PARC, Inc., Apr. 4, 2016, 1-26.

Mosko, M., "CCNx Semantics", Internet Engineering Task Force, PARC, Inc., Jul. 20, 2014, 1-9.

Unknown, Author, "CCNx Conference 2013", PARC, Palo Alto, California, Sep. 5-6, 2013, 1-84.

* cited by examiner

HANDOVER INITIATED ALIGNMENT OF PENDING INTEREST TABLES

TECHNICAL FIELD

The present invention relates to methods for conveying data in a cellular network and to corresponding devices and systems.

BACKGROUND

In networking, paradigms referred to as Information Centric Networking (ICN), Content Centric Networking (CCN), and Named Data Networking (NDN) have been developed. CCN and NDN may be regarded as specific approaches within the more general ICN paradigm. By way of example, CCN is being developed within IETF (Internet Engineering Task Force) by the ICNRG (ICN Research Group), and details on this work can be found in CCN as defined in ICNRG Internet-Drafts "CCNx Semantics", Version 01, January, 2016, and "CCNx Messages in TLV Format", Version 01, January 2016.

Instead of focusing on connecting communicating endpoints (as traditional networking protocols, such as IP (Internet Protocol), ICN focuses on a content object to be retrieved. In ICN, networking messages are routed based on globally unique names of content objects, rather than on endpoint addresses referring to physical boxes.

In this way, ICN may benefit from in distributing the same information to multiple places in the network. Since routers may cache content objects besides forwarding them, content objects do not need to traverse the entire network every time someone becomes interested in them—a local cached copy suffices. Another advantage with ICN is the aggregation of interests for a given content object. For example, in the case of a flash crowd event where suddenly thousands of endpoints are requesting the same content the source will only need to be reached by one request for the content, and all other requests may be served from the caches of routers along the path towards the source. Since these benefits is also relevant to cellular networks, it may be desirable to enhance a cellular network with CCN/ICN capabilities.

However, enhancement of a cellular network with ICN/CCN capabilities is not straightforward because in a cellular network an end device, also referred to as UE (user equipment) may move between different access nodes. If the UE has issued an ICN request for a content object and moved to another access node, the existing ICN/CCN mechanisms might not be sufficient to deliver the content object to the UE when it becomes available.

Accordingly, there is a need for techniques which allow for efficient utilization of ICN mechanisms in a cellular network.

SUMMARY

According to an embodiment of the invention, a method of conveying data in a cellular network is provided. According to the method, an access node of the cellular network receives, from a UE, at least one ICN request for a data object. The access node forwards the ICN request to a local gateway associated with the access node. The local gateway maintains a pending interest table (PIT) comprising an entry for each data object having a pending ICN request at the local gateway. In response to the UE moving from a coverage area of the access node to a coverage area of a further access node, the access node performs a handover procedure. The further access node is associated with a further local gateway maintaining a further PIT. The further PIT comprises an entry for each data object having a pending ICN request at the further local gateway. The handover procedure initiates alignment of the PIT and the further PIT with respect to at least one entry associated with the UE.

According to a further embodiment of the invention, a method of conveying data in a cellular network is provided. According to the method, a local gateway is associated with an access node of the cellular network. The local gateway maintains a PIT comprising an entry for each data object having a pending ICN request at the local gateway. The local gateway receives, from the access node, at least one ICN request of a UE for a data object. In response to the UE moving from a coverage area of the access node to a coverage area of a further access node, associated with a further local gateway maintaining a further PIT comprising an entry for each data object having a pending ICN request at the further local gateway, the local gateway performs alignment of the PIT and the further PIT with respect to at least one entry associated with the UE. The alignment of the PIT and the further PIT is initiated by a handover procedure of the UE from the access node to the further access node.

According to a further embodiment of the invention, a method of conveying data in a cellular network is provided. According to the method, an access node of the cellular network performs a handover procedure of a UE from a further access node to the access node. This is accomplished in response to the UE moving from a coverage area of the further access node to a coverage area of the access node. The access node is associated with a local gateway maintaining a PIT comprising an entry for each data object having a pending ICN request at the local gateway. The further access node is associated with a further local gateway maintaining a further PIT comprising an entry for each data object having a pending ICN request at the further local gateway. The handover procedure initiates alignment of the PIT and the further PIT with respect to at least one entry associated with the UE.

According to a further embodiment of the invention, a method of conveying data in a cellular network is provided. According to the method, a local gateway is associated with an access node of the cellular network. The local gateway maintains a PIT comprising an entry for each data object having a pending ICN request at the local gateway. In response to a UE moving from a coverage area of a further access node of the cellular network to a coverage area of the access node, the further access node being associated with a further local gateway maintaining a further PIT comprising an entry for each data object having a pending ICN request at the further local gateway, the local gateway performs alignment of the PIT and the further PIT with respect to at least one entry associated with the UE. The alignment of the PIT and the further PIT is initiated by a handover procedure of the UE from the further access node to the access node.

According to a further embodiment of the invention, an access node for a cellular network is provided. The access node is configured to receive, from a UE, at least one ICN request for a data object. Further, the access node is configured to forward the ICN request to a local gateway associated with the access node. The local gateway maintains a pending interest table (PIT) comprising an entry for each data object having a pending ICN request at the local gateway. Further, the access node is configured to, in response to the UE moving from a coverage area of the access node to a coverage area of a further access node, perform a handover procedure. The further access node is associated with a further local gateway maintaining a further PIT. The further PIT comprises an entry for each data object having a pending ICN request at the further local gateway. The handover procedure initiates alignment of the PIT and the further PIT with respect to at least one entry associated with the UE.

According to a further embodiment of the invention, a local gateway for a cellular network is provided. The local gateway is associated with an access node of the cellular network. Further, the local gateway is configured to maintain a PIT comprising an entry for each data object having a pending ICN request at the local gateway. Further, the local gateway is configured to receive, from the access node, at least one ICN request of a UE for a data object. Further, the local gateway is configured to, in response to the UE moving from a coverage area of the access node to a coverage area of a further access node, associated with a further local gateway maintaining a further PIT comprising an entry for each data object having a pending ICN request at the further local gateway, perform alignment of the PIT and the further PIT with respect to at least one entry associated with the UE. The alignment of the PIT and the further PIT is initiated by a handover procedure of the UE from the access node to the further access node.

According to a further embodiment of the invention, an access node for a cellular network is provided. The access node is configured to perform a handover procedure of a UE from a further access node to the access node. This is accomplished in response to the UE moving from a coverage area of the further access node to a coverage area of the access node. The access node is associated with a local gateway maintaining a PIT comprising an entry for each data object having a pending ICN request at the local gateway. The further access node is associated with a further local gateway maintaining a further PIT comprising an entry for each data object having a pending ICN request at the further local gateway. The handover procedure initiates alignment of the PIT and the further PIT with respect to at least one entry associated with the UE.

According to a further embodiment of the invention, a local gateway for a cellular network is provided. The local gateway is associated with an access node of the cellular network. Further, the local gateway is configured to maintain a PIT comprising an entry for each data object having a pending ICN request at the local gateway. Further, the local gateway is configured to, in response to a UE moving from a coverage area of a further access node of the cellular network to a coverage area of the access node, the further access node being associated with a further local gateway maintaining a further PIT comprising an entry for each data object having a pending ICN request at the further local gateway, perform alignment of the PIT and the further PIT with respect to at least one entry associated with the UE. The alignment of the PIT and the further PIT is initiated by a handover procedure of the UE from the further access node to the access node.

According to a further embodiment of the invention a system is provided. The system comprises at least one access node according to any one of the above embodiments and at least one local node according to any one of the above embodiments. Further, the system may comprise at least one UE according to the above embodiment.

According to a further embodiment of the invention, a computer program or computer program product is provided, e.g., in the form of a non-transitory storage medium, which comprises program code to be executed by at least one processor of an access node for a cellular network. Execution of the program code causes the access node to receive, from a UE, at least one ICN request for a data object. Further, execution of the program code causes the access node to forward the ICN request to a local gateway associated with the access node. The local gateway maintains a pending interest table (PIT) comprising an entry for each data object having a pending ICN request at the local gateway. Further, execution of the program code causes the access node to, in response to the UE moving from a coverage area of the access node to a coverage area of a further access node, perform a handover procedure. The further access node is associated with a further local gateway maintaining a further PIT. The further PIT comprises an entry for each data object having a pending ICN request at the further local gateway. The handover procedure initiates alignment of the PIT and the further PIT with respect to at least one entry associated with the UE.

According to a further embodiment of the invention, a computer program or computer program product is provided, e.g., in the form of a non-transitory storage medium, which comprises program code to be executed by at least one processor of a local gateway. Execution of the program code causes the local gateway to maintain a PIT. The PIT comprises an entry for each data object having a pending ICN request at the local gateway. Further, execution of the program code causes the local gateway to receive, from an access node associated with the local gateway, at least one ICN request of a UE for a data object. Further, execution of the program code causes the local gateway to, in response to the UE moving from a coverage area of the access node to a coverage area of a further access node, associated with a further local gateway maintaining a further PIT comprising an entry for each data object having a pending ICN request at the further local gateway, perform alignment of the PIT and the further PIT with respect to at least one entry associated with the UE. The alignment of the PIT and the further PIT is initiated by a handover procedure of the UE from the access node to the further access node.

According to a further embodiment of the invention, a computer program or computer program product is provided, e.g., in the form of a non-transitory storage medium, which comprises program code to be executed by at least one processor of an access node for a cellular network. Execution of the program code causes the access node to perform a handover procedure of a UE from a further access node to the access node. This is accomplished in response to the UE moving from a coverage area of the further access node to a coverage area of the access node. The access node is associated with a local gateway maintaining a PIT comprising an entry for each data object having a pending ICN request at the local gateway. The further access node is associated with a further local gateway maintaining a further PIT comprising an entry for each data object having a pending ICN request at the further local gateway. The handover procedure initiates alignment of the PIT and the further PIT with respect to at least one entry associated with the UE.

According to a further embodiment of the invention, a computer program or computer program product is provided, e.g., in the form of a non-transitory storage medium, which comprises program code to be executed by at least one processor of a local gateway. The local gateway is associated with an access node of the cellular network. Execution of the program code causes the local gateway to maintain a PIT. The PIT comprises an entry for each data object having a pending ICN request at the local gateway. Further, execution of the program code causes the local gateway to, in response to a UE moving from a coverage area of a further access node of the cellular network to a coverage area of the access node, the further access node being associated with a further local gateway maintaining a further PIT comprising an entry for each data object having a pending ICN request at the further local gateway, perform alignment of the PIT and the further PIT with respect to at least one entry associated with the UE. The alignment of the PIT and the further PIT is initiated by a handover procedure of the UE from the further access node to the access node.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings.

The illustrated embodiments relate to conveying of data in a cellular network using ICN mechanisms, by ICN nodes and ICN messages. For example, the data may be conveyed on the basis of CCN mechanisms as specified in ICNRG Internet-Drafts "CCNx Semantics", Version 01, January, 2016, and "CCNx Messages in TLV Format", Version 01, January 2016. However, other ICN, CCN or NDN mechanisms could be utilized as well. Accordingly, in the examples as further detailed below nodes will be referred to as ICN/CCN/NDN nodes, and messages will be referred to as ICN/CCN/NDN messages.

Figure 1:
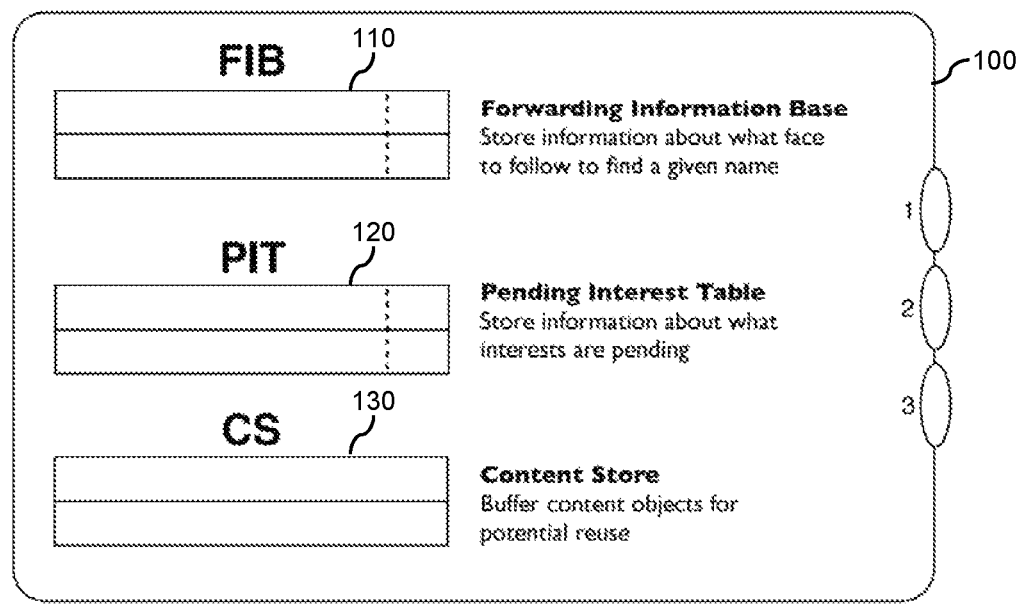
FIG. 1 schematically illustrates an ICN node as used in an embodiment of the invention.
Figure 2A:
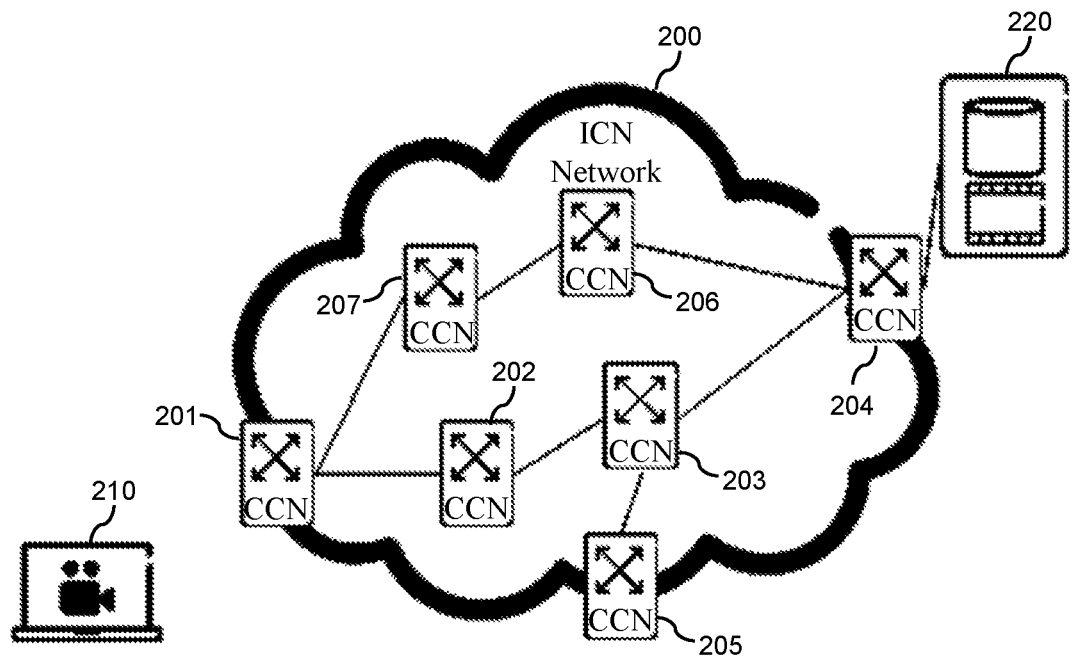
FIG. 2A-2F show an example of an ICN architecture according to an embodiment of the invention and various ICN networking scenarios according to embodiments of the invention.

In CCN, as may be utilized in the examples illustrated below, a Content Object is retrieved by issuing an Interest message to the network. The Interest message contains the name of the Content Object. Such a message is routed by the network towards the source/publisher of the Content Object. CCN Nodes along the path check if they have a cached copy of the object. If so they will respond to the Interest message with a Data message containing the requested Content Object and the Interest message will not be propagated any further. The routing is assisted by the name being a structured name (similar to domain names, but with richer syntax). Routers maintain a Forwarding Information Base (FIB) with information about where to forward which name or name prefix. The routers along the path of the Interest message keep a record of the Interest messages they have forwarded (where it came from and what Content Object it was naming) in a Pending Interest Table (PIT). If other Interest messages to the same name arrive to the router, it does not forward them, but just notes them in the PIT besides the entry for this name. This process is called Interest aggregation. As a result, the PIT entries for the same name may form a tree in the network with receivers as leafs. FIG. 1 shows an overview illustration of a CCN node 100 as presented in the keynote of the CCNx Conference 2013, September 5th & 6th, PARC, Palo Alto, Calif., available on the Internet under "http://security.riit.tsinghua.edu.cn/mediawiki/images/5/53/CCNx-Keynote_Edens.pdf". As illustrated, the CCN node 100 provides an FIB 110 which stores information about which interface (e.g. one of the interfaces) designated by "1", "2", and "3", should be used to find a content object of a given name. Further, the CCN node 100 provides a PIT 120 which stores information about what interests are pending. Further, the CCN node 100 provides a Content Store (CS) 130 which may buffer, i.e., temporarily store, content objects for potential reuse. ICN/CCN nodes as mentioned below may provide corresponding structures or functionalities. FIG. 2A schematically illustrates an exemplary CCN scenario. Specifically, FIG. 2A shows a network 200 with network elements 201, 202, 203, 204, 205, 206, 207 corresponding to CCN nodes, an end-device 210 coupled to the network 200, and a content source 220 coupled to the network 200. The CCN nodes 201, 202, 203, 204, 205, 206, 207 may correspond to routers. The end-device 210 may correspond to a user terminal, such as a UE with cellular network connectivity. The content source 220 may correspond to a server.

Figure 2B:
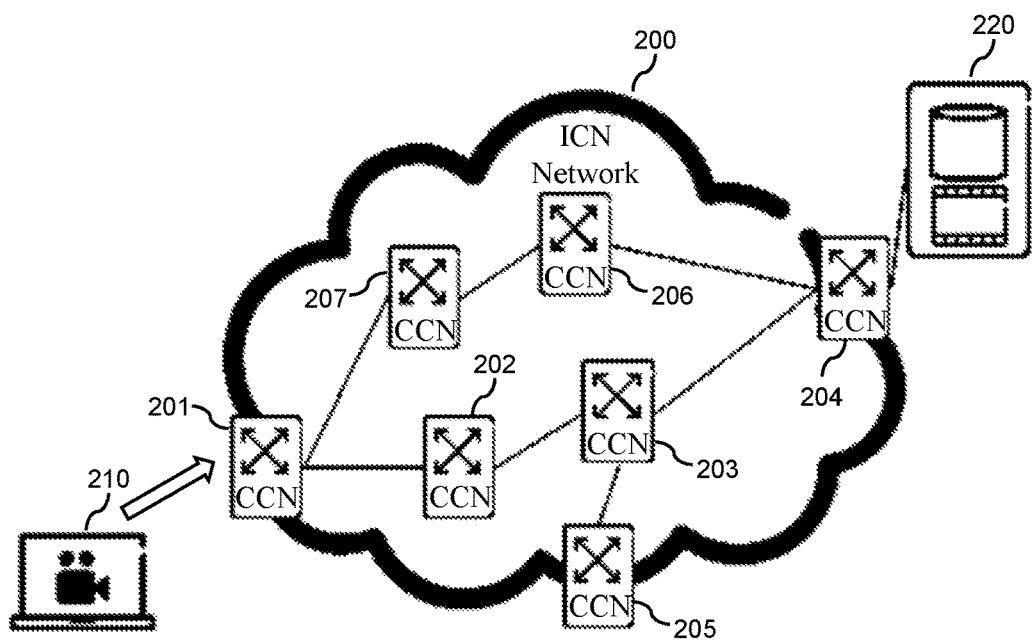

FIG. 2B to 2F are based on the scenario of FIG. 2A and illustrate various aspects of ICN/CCN including prefix routing, caching at ICN/CCN nodes, i.e., temporary storage of a Content Object in the CS, and optimized delivery of cached Content Objects. Specifically, FIG. 2B shows that the end-device 210 sends an Interest message (illustrated by the arrow) to request a Content Object which is available from the content source 220. The Interest message identifies the Content Object by a name.

Figure 2C:
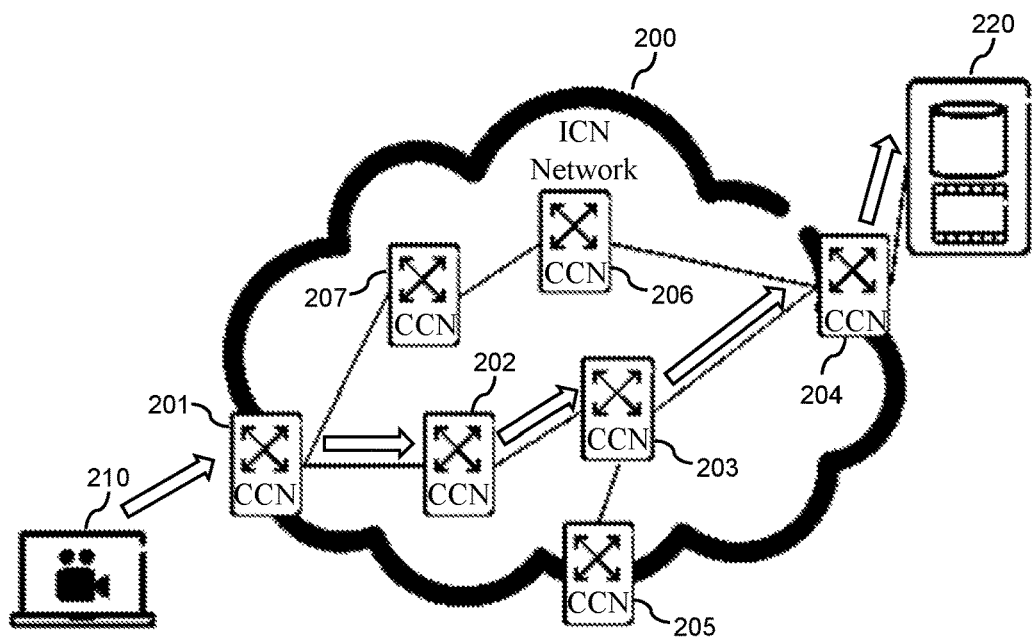

As a next step, FIG. 2C illustrates prefix routing to determine a route through the network 200 to the requested Content Object. The prefix routing utilizes a part of the name of the content object, referred to as prefix, and matching of the prefix to entries of the FIB of the CCN nodes 201, 202, 203, 204, 205, 206, 207. As indicated by the arrows in FIG. 2C, a route from the end-device 210 to the content source 220, extending via the CCN nodes 201, 202, 203, 204, is obtained in this way. At each of these CCN nodes, it is checked whether the Content Object is locally available in the CS, and if this is not the case, the Interest is forwarded to the next-hop CCN node, and a corresponding entry is stored in the PIT. In the illustrated scenario, it is assumed that the Content Object is available only at the content source 220 and the Interest is thus propagated up to the content source to 220.

Figure 2D:
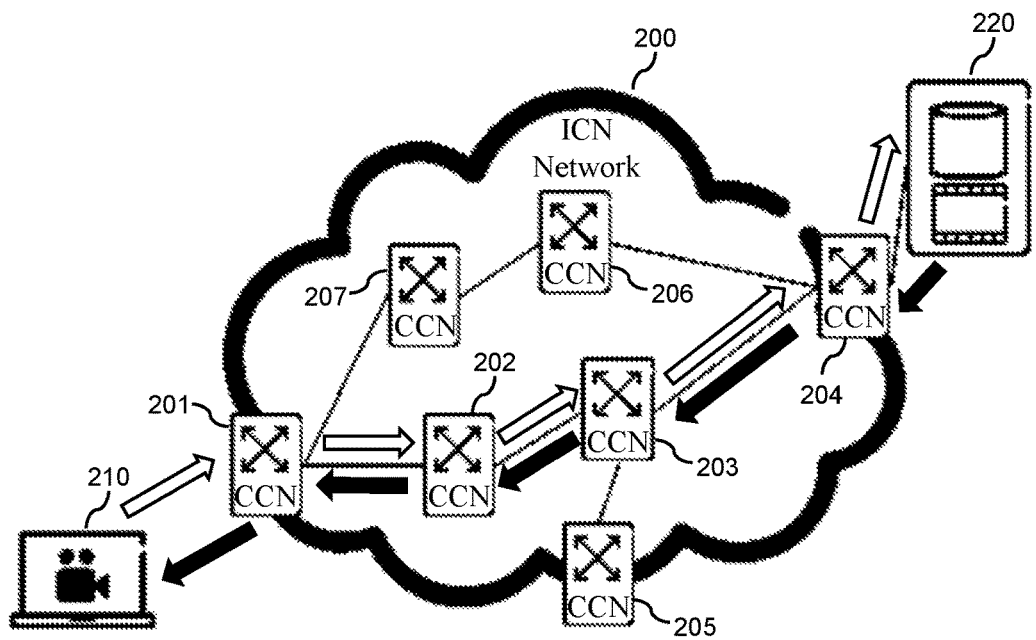

As a next step, FIG. 2D illustrates caching of the Content Object at the CCN nodes along the determined route. In particular, the Content Object is provided in Data messages from the content source 220 via the CCN nodes 204, 203, 202, 201 to the end-device 210, as illustrated by the solid arrows, and the content object is cached by each of the CCN nodes 204, 203, 202, 201.

Figure 2E:
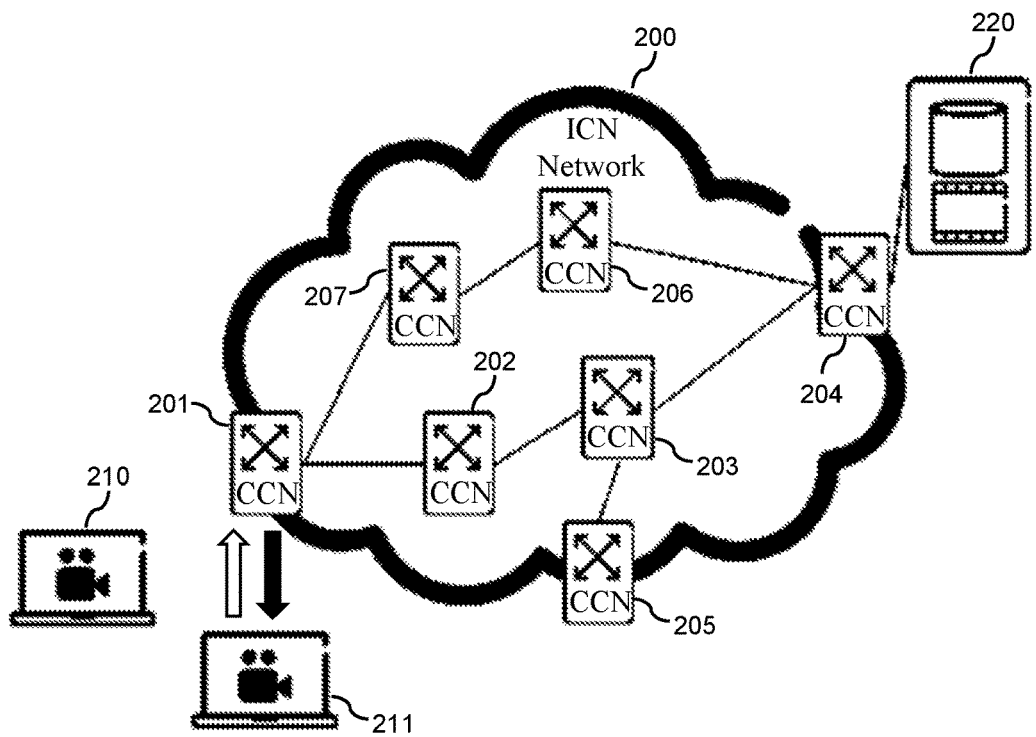

As illustrated by FIG. 2E, the caching of the Content Object may be utilized for optimized content delivery. In the example of FIG. 3D, another end-device 211 requests the same Content Object by sending an Interest message naming this Content Object (illustrated by an open arrow) to the CCN node 201. Because the content object is cached at the CCN node 201, the CCN node 201 can directly respond to the end-device 211 with a data message including the requested Content Object (illustrated by a solid arrow), without further propagating the Interest.

Figure 2F:
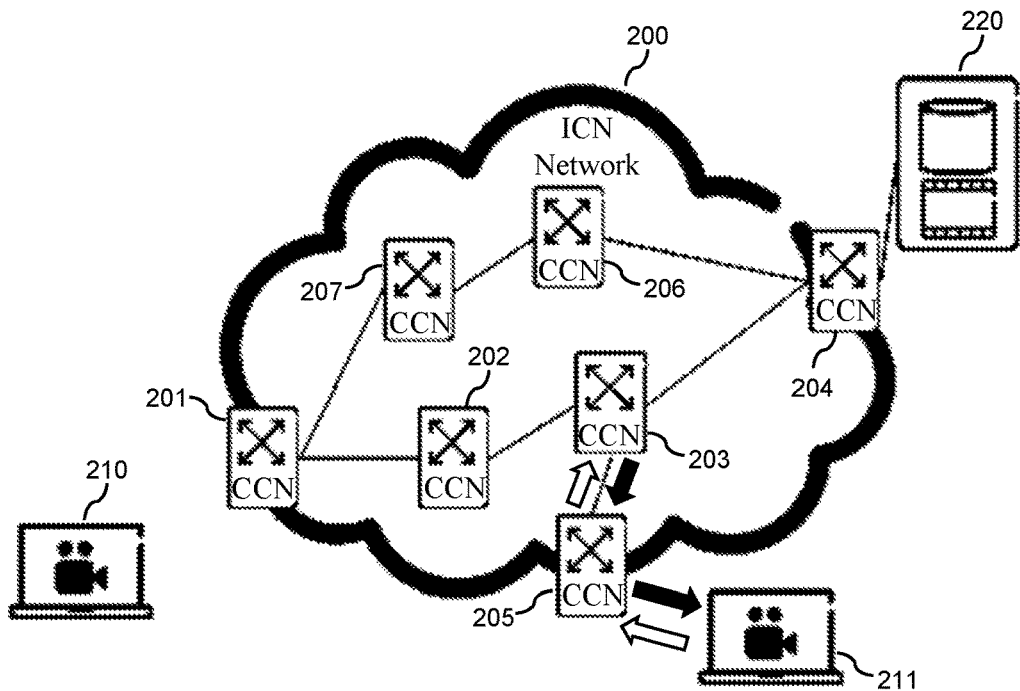

As illustrated by FIG. 2F, also mobility of the end-device may be handled in an efficient manner. In the example of FIG. 2F, it is assumed that the end device 211 moved and is now connected to the CCN node 205 before the requested Content Object was delivered to the end device 211. This is addressed by the end-device 211 resending the Invite message, thereby informing the ICN network 200 that the end-device 211 moved and initiating updating of the FIBs and PITs. In the illustrated example, a route to the content object, which is cached at the CCN node 203 is determined by prefix routing, as indicated by open arrows, and the content object can then be delivered from the CCN node 203 via the CCN node 205 to the end device 211, as indicated by solid arrows.

Accordingly, when the Interest message reaches an endpoint (or router) having a copy of the Content Object (perhaps cached), the Interest message is responded to with a Data message, which is propagated backwards along the path the Interest message took. The backward path is learned from the entries the Interest message left in the PIT of the routers along the path. If there were multiple Interests arriving at a router for this name, the Data message containing the Content Object is replicated towards each direction, where the Interest messages came from. After forwarding a Content Object matching a pending Interest, the routers delete the corresponding entry in the PIT, thus these entries are expected to be short-lived. When the original endpoint(s) generating the Interest message(s) receive the Content Object the transaction is considered closed.

The Interest aggregation mechanism typically forms a hierarchical tree in the ICN/CCN network where request packets are aggregated and response packets are de-aggregated at each level of the tree. This allows ICN networks to scale with increasing number of clients.

Figure 3A:
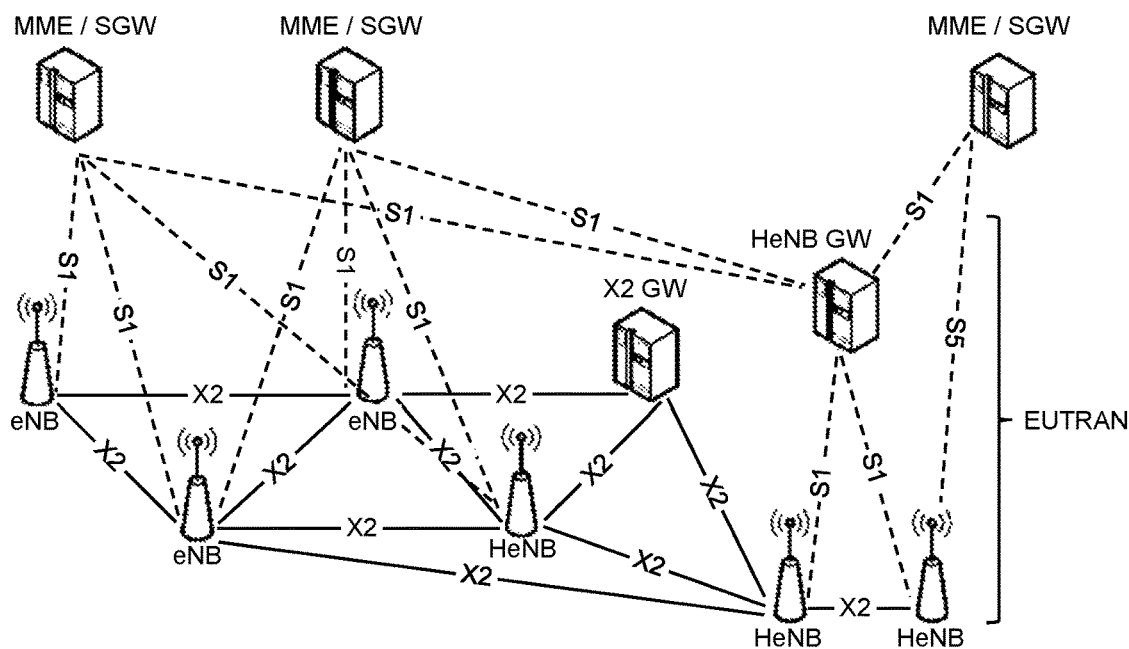
FIG. 3A shows an example of an LTE cellular network architecture as used according to an embodiment of the invention.

FIG. 3A illustrates architecture elements of a cellular network based on the LTE technology as defined in 3GPP TS 36.300 V13.2.0 (2015-12). As illustrated, in this case the cellular network includes radio access nodes in the form for eNBs and HeNBs (HeNB: Home eNB). The eNBs and HeNBs are connected by interfaces referred to as "X2". Further architecture elements include an X2 Gateway (X2 GW), an HeNB Gateway (HeNB GW), and MME/S-GWs (MME: Mobility Management Entity, SGW: Serving Gateway). As illustrated, the X2 GW may serve as on optional intermediate node of the X2 interface between two or more of the eNBs and HeNBs. The MME/SGWs and the HeNB GW serve as control nodes and data plane gateways for the eNBs and HeNBs and are connected thereto via interfaces referred to as "S1". As further illustrated, an HeNB may also be connected to an MME/SGW via an interface referred to as "S5", e.g, if the HeNB is co-located with a local gateway (LGW) as further explained below. The eNBs and HeNBs (as well as the X2 GW and the HeNB GW) are regarded as elements of the Evolved UMTS Terrestrial Radio Access Network (E-UTRAN), and the MME/SGWs are regarded as elements of the Evolved Packet Core (EPC) of the Evolved Packet System (EPS).

The EPS includes the E-UTRAN the EPC and LTE capable UEs. Two different connection management states are defined in which the UE can be, which are referred to as ECM-IDLE (or "IDLE") and ECM-CONNECTED (or "ACTIVE). In ECM-IDLE, the UE position is known on Tracking Area (TA) level. Such TAs can consist of one or more cells. The UE does not have any active RRC (Radio Resource Control) or S1 connection. To reach the UE, the MME in the EPC will initiate paging by sending paging messages over S1 to the eNBs in the TA(s) that the UE is located in. The eNBs will then page the UE over the LTE radio interface (referred to as Uu interface). In ECM-CONNECTED, the UE position is known on cell level in the E-UTRAN and there is an active RRC and S1 connection. This state is used for data transmission to and from the UE, and when the UE moves the UE will be handed over to other cells. Inactive UEs are typically released to ECM-IDLE state in order to reduce UE battery consumption and to minimize signalling in the network.

Figure 3B:
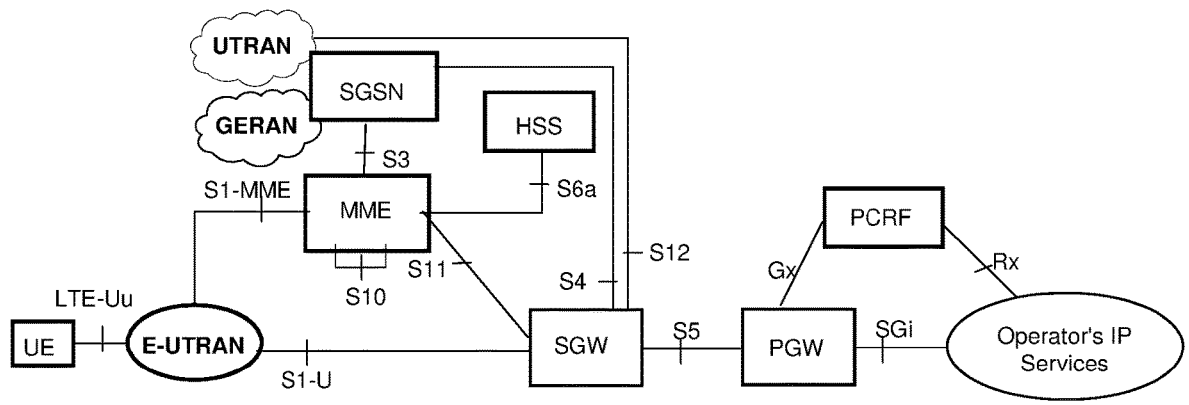
FIG. 3B shows an example of an EPC (Evolved Packet Core) architecture as used according to an embodiment of the invention.

FIG. 3B further illustrates the EPC architecture as defined in TS 23.401 V13.5.0 (2015-12). Specifically, FIG. 3B shows the UE, the E-UTRAN, the MME, SGW, and further network elements referred to as PDN (Packet Data Network) Gateway or PGW, SGSN (Serving GPRS Support Node), HSS (Home Subscriber Server), and PCRF (Policy and Charging Rules Function), allowing access to the operators IP services, such as IMS (IP Multmedia Subsystem) services, PSS (Packet Switched Streaming) service, or the like. Further, FIG. 3B shows other radio access networks, in particular a UTRAN (UMTS Terrestrial Radio Access Network) and a GERAN (GSM EDGE Radio Access Network).

In the context of the EPC, a PDN (Packet Data Network) is a network that a UE connects to. In many cases, the PDN is an IP-based network. It may correspond to the Internet or to a network offering operator-internal services, like IMS. A further type of PDN which is considered in the present disclosure is an ICN/CCN network, such as illustrated in FIGS. 2A-2F. An APN (Access Point Name) is a string indicating the name of a PDN (e.g. "Internet"). A PDN is typically associated with one APN, but it is also possible to give a single PDN multiple APNs. APNs are typically chosen by the operator. The PGW is a gateway that connects one or more access networks (e.g., LTE or WiFi to one or more PDNs. A PDN Connection defines a logical tunnel between a UE and a PGW, allowing the UE to access a PDN. PDN connection establishment is typically initiated by the UE. At establishment, the UE indicates the APN. When connected to the EPC, the UE has at least one PDN connection. In some scenarios, the UE can have multiple PDN connections. A PDN type (also referred to as PDP type) is defined by the protocol type for packets used by the PDN (and therefore also for the PDN connection). The PDN type is typically indicated by the UE at establishment of the PDN connection. Each PDN connection is of a single PDN type. In EPC, valid PDN types for example include "IPv4" or "IPv6" or "IPv4v6" (dual stack). A bearer refers to a channel to differentiate traffic within a PDN connection. Each PDN connection has at least one bearer (referred to as default bearer) and may have one or more additional (dedicated) bearers. In EPC, a bearer typically consists of three segments: a radio bearer (extending from UE to eNB), an S1 bearer (extending from eNB to SGW), and S5/S8 bearer (extending from SGW to PGW). The latter two are carried by a GTP (GSM Tunneling Protocol) tunnel and are identified by a Tunnel Endpoint ID (TEID). The SGW and PGW cardinality is given by the number of SGW/PGWs the UE is connected to: In the EPC, a UE is typically connected to a single SGW (and a single MME). In some scenarios, a UE may be connected to multiple PGWs (e.g., if it has multiple PDN connections), with the restriction that all PDN connections of a UE to the same APN shall go via the same PGW.

Figure 4:
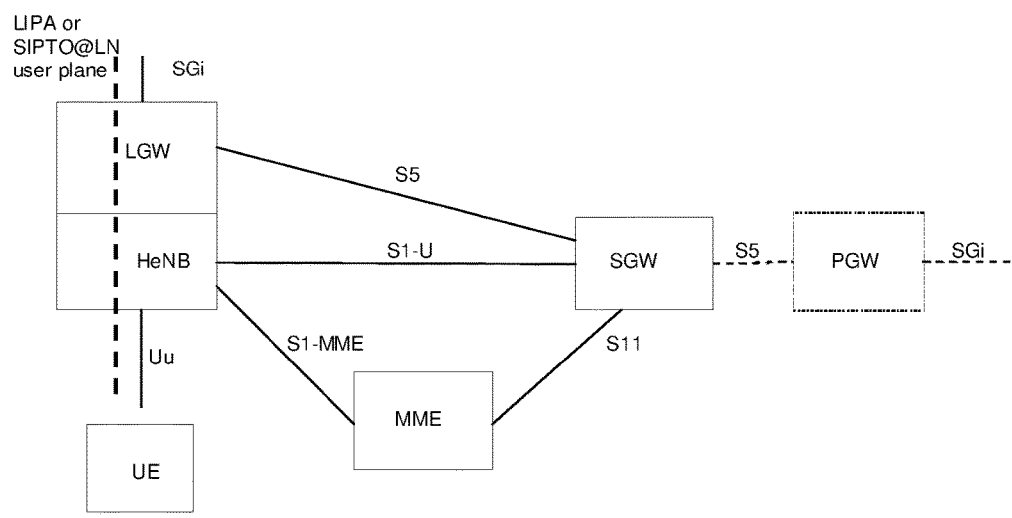
FIG. 4 shows an example of utilizing a local gateway in ICN mechanisms according to an embodiment of the invention.

As mentioned above, the EPC allows for using a HeNB, which is a small eNB that can for example be provided as an LTE access point in a home. To support break-out to a home network, an LGW may be collocated with the HeNB, as illustrated in FIG. 4. Further details concerning the utilization and characteristics of an LGW can be found in 3GPP TS 23.401 V13.5.0. It is noted that an LGW could also be utilized in connection with other kinds of eNBs or access nodes.

From an architecture perspective, the LGW may be regarded as a simplified PGW. Like in the case of an ordinary PGW, there is an S5 interface between the LGW and the SGW. One difference is that there is also a direct interface (a so-called direct tunnel) between the HeNB and the LGW. Using this direct tunnel, data plane packets can take the shortcut defined by the route UE-HeNB-LGW-SGi, instead of taking the route UE-HeNB-SGW-LGW-SGi. When the SGW sets up the S5 tunnel, the SGW signals the S5 TEID to the MME, and the MME signals that TEID to the HeNB, as a so-called "Correlation ID". This ID may be used by the HeNB/LGW to correlate the UE to the S5 tunnel.

One possibility for introducing ICN/CCN enhancements in a cellular network is to introduce ICN/CCN router functionality in the cellular base station (or in the vicinity of the cellular base station), e.g., in or in the vicinity of the eNBs or HeNBs as shown in FIG. 3. Specifically, the ICN/CCN router functionalities could be implemented in the LGW, which is co-located or otherwise closely associated with the eNB or HeNB.

However, a problem that could occur in this type of ICN/CCN solution is that the UE could have issued an Interest message for a Content Object, but not yet have received the Content Object, i.e., have a pending ICN request in the ICN/CCN network, and then moves to the coverage area of another eNB. In this case, when the Content Object arrives at the eNB which recently served the UE, there is no way for the eNB to deliver the Content Object to the UE.

Figure 5:
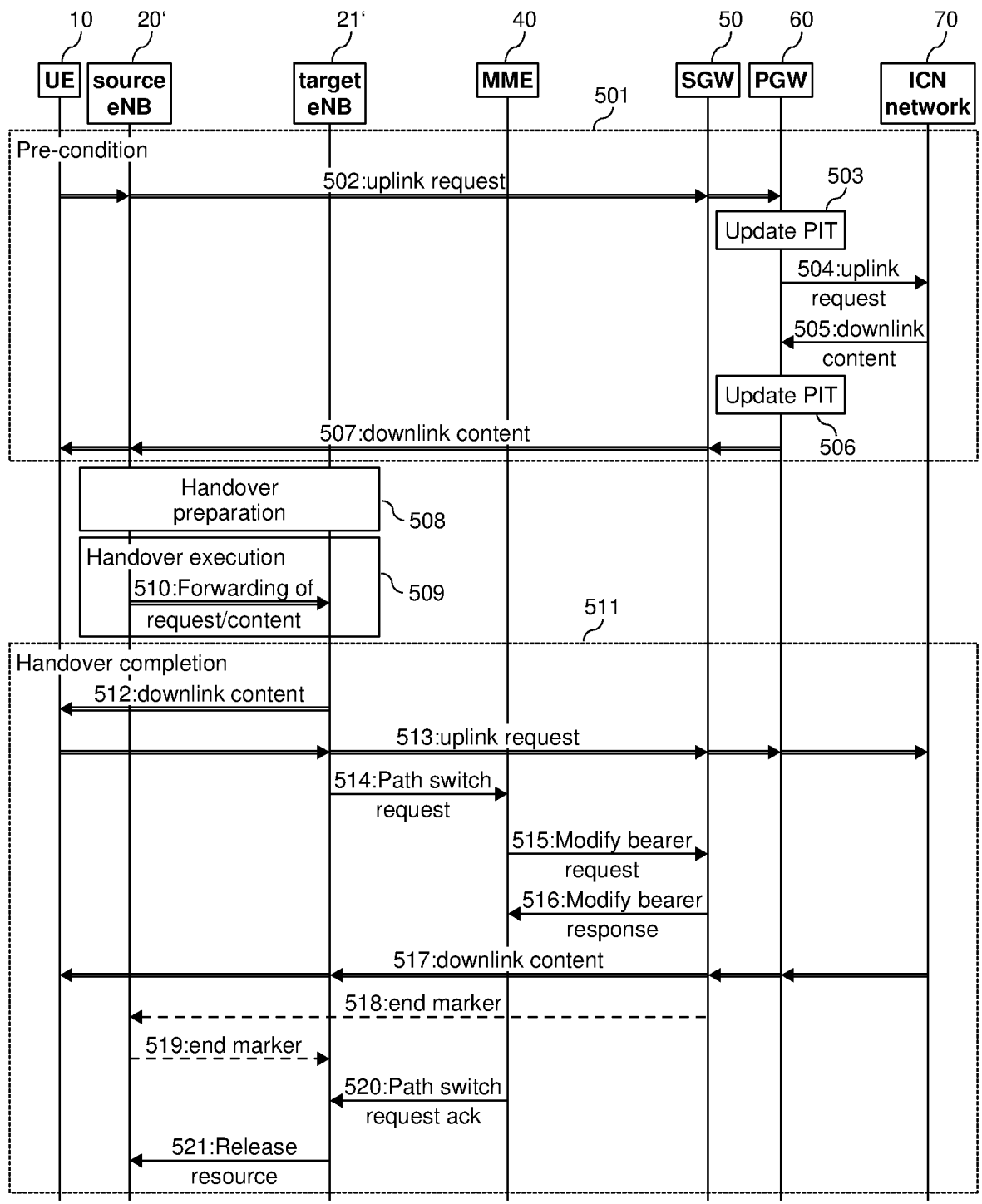
FIG. 5 shows an example of a handover scenario when implementing ICN mechanisms at a centralized gateway.

For illustrative purposes, FIG. 5 shows an exemplary UE mobility scenario. The scenario of FIG. 5 involves a UE 10, a source eNB 20', a target eNB 21', an MME 40, an SGW 50, a PGW 60, and an ICN network 70. The ICN network 70 may for example include multiple ICN nodes which are organized as explained in connection with FIGS. 2A-2F.

In FIG. 5, double-line arrows indicate user plane traffic. It is noted that such user plane traffic is not mandatory and may occur according to user activity at the UE 10. In the scenario of FIG. 5, it is assumed that ICN/CCN functionalities are implemented at the PGW 60. That is to say, in this case the PGW 60 may implement functionalities of an ICN/CCN node as for example explained in connection with FIG. 1, such as receiving and forwarding ICN requests for data objects and maintaining a PIT.

The processes as illustrated in FIG. 5 assume as a precondition (as illustrated by block 501), that the UE 10 sends an ICN request 502 for content, which is received by the source eNB 20' and then forwarded via the SGW 50 to the PGW 60. The PGW 60 updates its PIT, as illustrated by block 503, and forwards the ICN request to the ICN network, as illustrated by message 504. The ICN network responds with the requested content, as illustrated by message 505, the PGW 60 updates its PIT, as illustrated by block 506, and the PGW 60 forwards the content via the SGW 50 and the source eNB 20' to the UE 10.

The scenario of FIG. 5 further assumes that the UE 10 then moves from a coverage area of the source eNB 20' to a coverage area of the target eNB 21'. This triggers a handover procedure, including a handover preparation phase, as illustrated by block 508 and a handover execution phase, as illustrated by block 509. As illustrated by message 510, during handover execution, content, requests, or other data, may be forwarded from the source eNB 20' to the target eNB 21. Further, the handover procedure includes a handover completion phase, as illustrated by block 511. As illustrated by message 512, during handover completion the target eNB 21' may provide the forwarded content to the UE 10. Further, the UE 10 may send an ICN request 513 for content, which is now received by the target eNB 21' and then forwarded via the SGW 50 and the PGW 60 to the ICN network 70.

For completing the handover, the target eNB 21' sends a path switch request 514 to the MME 40. In response to the path switch request 514, the MME 40 sends a modify bearer request 515 to the SGW 50, and the SGW 50 responds with a modify bearer response 516. The ICN network responds with the requested content, which is forwarded via the PGW 60, the SGW 50, and the target eNB 21' to the UE 10, as illustrated by message 517.

As further illustrated, completion of the handover includes that the SGW 50 sends an end marker 518 to the source eNB 20', the source eNB 20' sends an end marker 519 to the target eNB 21'. Further, the MME 40 responds to the path switch request 514 by sending a path switch request acknowledgement 520 to the target eNB 21', and the target eNB 21' sends a release resource command 521 to the source eNB 20', thereby triggering the source eNB 20' to release the resources associated with the PDN connection of the UE 10.

The handover procedure of FIG. 5, in particular the handover preparation phase 508, the handover execution phase 509, and the handover completion stage 511 may correspond to the "X2-based handover without Serving GW relocation" as defined in 3GPP TS 23.401 section 5.5.1.1.2, with the difference that in this case the PGW 60 is ICN enabled and handles user plane traffic accordingly, e.g., by keeping a PIT.

However, in order to improve efficiency of handling ICN data traffic, it may be desirable to break out the ICN data traffic closer to the eNB, e.g., at an ICN-enabled LGW co-located with the eNB, such as illustrated in FIG. 4. In such scenarios, a handover procedure as shown in FIG. 5 may not be sufficient, because with handover of the UE also the responsible ICN enabled LGW may change. In the following, handling of mobility related issues in such scenarios will be explained in more detail.

In the illustrated concepts, it is assumed that handing over a UE from one eNB to another eNB has the effect that also the LGW responsible for handling ICN requests from the UE changes. In the following, the LGW which is responsible before the handover is referred to as source LGW, and the LGW which is responsible after the handover is referred to as target LGW. As each LGW has a unique PIT, alignment of the PIT of the source LGW and the target LGW is performed along with the handover procedure to avoid duplicated or missed contents requested by the UE in the ICN/CCN network. It is noted that within the present disclosure the term "content" might also be called "data object" or Content Object.

According to an exemplary scenario, the eNB (or HeNB) has one or more UEs in its coverage area. These UEs have made content requests to the ICN/CCN network. These requests are stored in the PIT of the LGW of the eNB to which the UE was attached at the time the UE made the request. If a UE is handed over from a source eNB to a target eNB, then also the UE content requests stored in the PIT of the LGW of the source eNB (i.e., in the PIT of the source LGW) may need to be aligned with the PIT of the LGW of the target eNB (i.e., the PIT of the target LGW). Alignment may denote in this context: deleting and/or updating entries in the PIT's and/or copying entries from one PIT to another PIT for an UE that is handed over so that both PITs of the source and target LGW are aligned to the new situation.

In the following, various embodiments will be explained which involve different timing in the handover procedure with respect to copying PIT entries of the UE, removing of PIT entries in the source LGW, and/or updating of the PIT in the target LGW.

Some embodiments illustrated below also relate to selecting a target LGW. Such selection of a target LGW may be performed if there is an N:M relation between eNBs and LGWs, which means that there is no unique assignment of an eNB to a certain LGW. The target LGW can be selected before the alignment of the source and target PITs takes place. Either the target eNB selects the target LGW or the selection is done by an MME to which the target eNB is connected. The embodiments relating to selecting the target LGW can be combined with the above described embodiments related to handing over a UE from one eNB to another eNB. Further the embodiments relating to selecting the target LGW can be used independently from the above described embodiments related to handing over a UE from one eNB to another eNB, e.g., at initial connection establishment of a UE.

As a result, the illustrated concepts may help to ensure that the data object that the UE has requested will be delivered to the UE, independently of the UE being (currently) handed over between eNBs. In this way, it can be avoided that the UE needs to re-request the data object based on some timer, which may add undesired signaling and delays.

Figure 6:
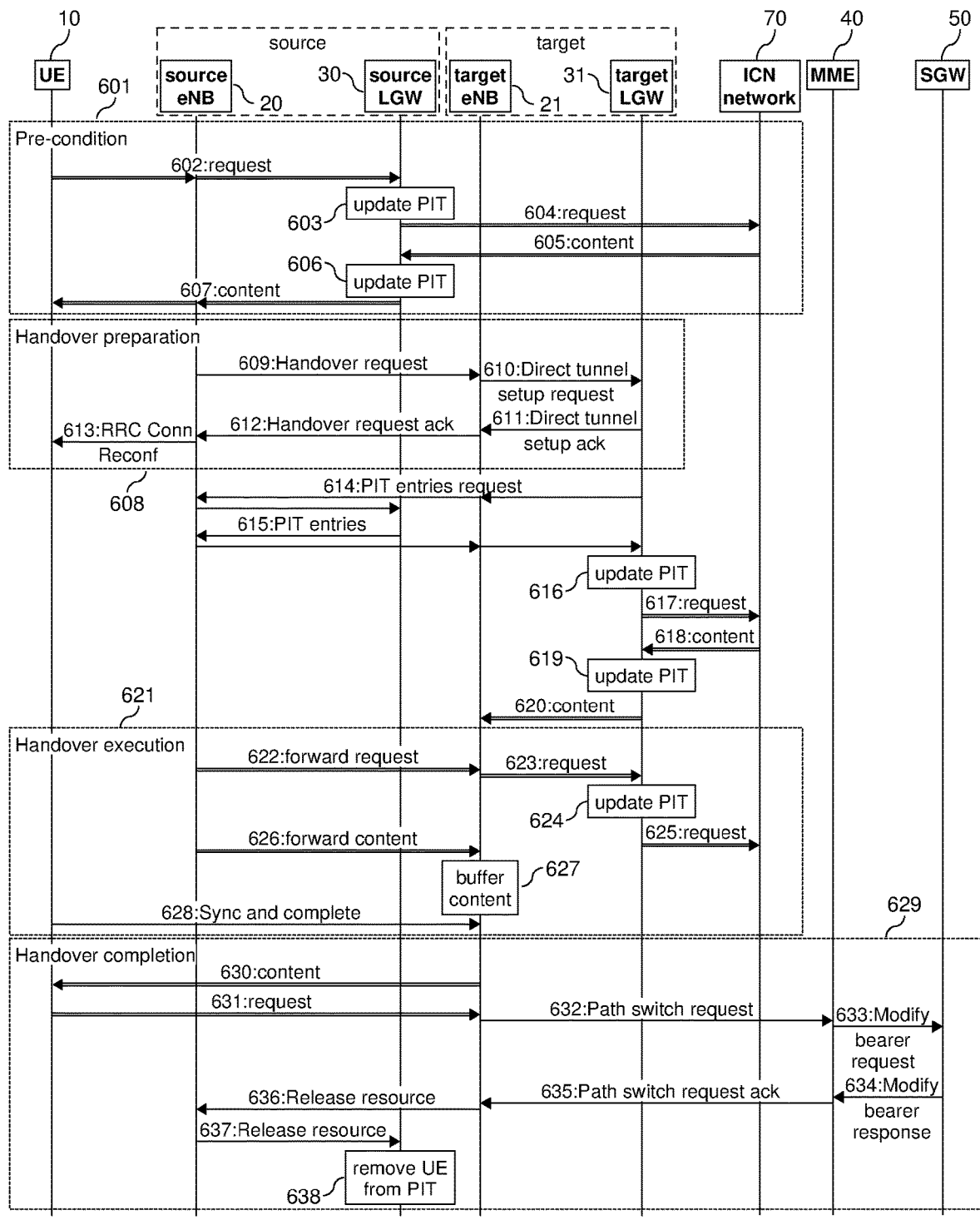
FIGS. 6 to 9 show examples of handover scenarios when implementing ICN mechanisms at local gateways.

FIG. 6 shows a UE mobility scenario based on assuming multiple ICN enabled LGWs. The scenario of FIG. 6 involves a UE 10, a source eNB 20, a source LGW, a target eNB 21, a target LGW, an MME 40, an SGW 50, a PGW 60, and an ICN network 70. The ICN network 70 may or example include multiple ICN nodes which are organized as explained in connection with FIGS. 2A-2F.

In FIG. 6, double-line arrows indicate user plane traffic. It is noted that such user plane traffic is not mandatory and may occur according to user activity at the UE 10. In the scenario of FIG. 6, it is assumed that ICN/CCN functionalities are implemented at the LGWs, i.e., the source LGW 30 and the target LGW 31. That is to say, in this case the LGWs 30, 31 may implement functionalities of an ICN/CCN node as for example explained in connection with FIG. 1, such as receiving and forwarding ICN requests for data objects and maintaining a PIT.

The processes as illustrated in FIG. 6 assume as a precondition (as illustrated by block 601), that the UE 10 sends an ICN request 602 for content, which is received by the source eNB 20 and then forwarded to the source LGW 30. The source LGW 30 updates its PIT, as illustrated by block 603, and forwards the ICN request to the ICN network 70, as illustrated by message 604. The ICN network 70 responds with the requested content, as illustrated by message 605, the source LGW 30 updates its PIT, as illustrated by block 606, and the source LGW 30 forwards the content via the source eNB 20 to the UE 10.

The scenario of FIG. 6 further assumes that the UE 10 then moves from a coverage area of the source eNB 20 to a coverage area of the target eNB 21. This triggers a handover procedure, including a handover preparation phase, as illustrated by block 608. The handover preparation phase 608 is assumed to be based on the procedure as defined in 3GPP TS 36.300 V13.2.0 and includes that the source eNB 20 sends a handover request 609 to the target eNB 21. However, in this case the handover preparation phase 608 also involves the addition that a connection is setup between the source LGW 30 and the target LGW 31. This includes setting up a direct tunnel between the target eNB 21 and the target LGW 31, which is initiated by the target eNB 21 sending a direct tunnel setup request 610 to the target LGW 31, to which the target LGW 31 responds with a direct tunnel setup acknowledgement 611. The connection between the source LGW 30 and the target LGW 31 thus extends via the source eNB 20 and the target eNB 21. A temporary connection established between the source eNB 20 and the target eNB 21 during the handover procedure (via the X2 interface) is used as part of the connection. Further, in accordance with the procedure of 3GPP 36.300 V13.2.0, the target eNB 21 responds to the handover request 609 by sending a handover request acknowledgement 612 to the source eNB 20, and the source eNB 20 triggers handover of the UE 10 by sending an RRC Connection Reconfiguration message 613 to the UE 10.

Once the connection between the source LGW 30 and the target LGW 31 has been setup, the target LGW 31 may ask the source LGW 30 for pending ICN requests for the UE, as indicated by PIT entries request 614, and the source eNB 20 may respond with the requested PIT information as indicated by PIT entries message 615. Once received, the target LGW 31 may update its PIT, as indicted by step 616 and re-send the ICN requests by the UE 10, such that the requested content will arrive at the target LGW 31, as indicated by request/content messages 619. Further, upon receiving the requested content, the target LGW 31 may again update its PIT, as indicated by step 619. Still further, the target LGW 31 may then provide the received content to the target eNB 21.

Further, the handover procedure of FIG. 6 includes a handover execution phase, as illustrated by block 621. As illustrated by message 622, during handover execution, an ICN request from the UE 10, may be forwarded from the source eNB 20 to the target eNB 21. The target eNB 21 may in turn forward the ICN request to the target LGW 31, as illustrated by message 623. The target LGW 31 updates its PIT, as illustrated by block 624, and forwards the ICN request to the ICN network 70, as illustrated by message 625. As further illustrated by message 626, during handover execution, content received by the source eNB 20 may be forwarded from the source eNB 20 to the target eNB 21. As illustrated by block 627, the target eNB 21 may then buffer this content for later delivery to the UE 10. As illustrated, the handover execution phase ends when the UE 10 sends a sync and complete message 628 to the target eNB 21, thereby indicating that the UE 10 is now synchronized and connected to the target eNB 21. Details of the handover execution phase 621 and its messages may be as specified in 3GPP TS 36.300 V13.2.0.

Further, the handover procedure of FIG. 6 includes a handover completion phase, as illustrated by block 629. As illustrated by message 630, during handover completion, the target eNB 21 may provide the forwarded content to the UE 10. Further, the UE 10 may send an ICN request 631 for content, which is now received by the target eNB 21 (and then forwarded to and handled by the target LGW 31). For completing the handover, the target eNB 21 sends a path switch request 632 to the MME 40. In response to the path switch request 632, the MME 40 sends a modify bearer request 633 to the SGW 50, and the SGW 50 responds with a modify bearer response 634. The MME 40 then responds to the path switch request 632 by sending a path switch request acknowledgement 635 to the target eNB 21, and the target eNB 21 sends a release resource command 636 to the source eNB 20, thereby triggering the source eNB 20 to release the resources associated with the PDN connection of the UE 10. As further illustrated, the source eNB 20 sends a resource release command 637 to the source LGW 30, thereby triggering the source LGW 30 to release the resources associated with the PDN connection of the UE 10. As illustrated by step 638, this releasing of the resources may include removing information associated with the UE 10 from the PIT of the source LGW 30. Here, it is noted that for this purpose one or more entries may be deleted completely from the PIT if there is no pending ICN requests for the corresponding content from another UE. Otherwise, only an association of the PIT entry with the UE 10, e.g., in terms of a UE identifier stored in the PIT, may be removed.

As can be seen from FIG. 6, the handling of mobility by the LGWs 30, 31 is different from the behavior specified in 3GPP TS 23.401 V13.5.0, where it is stated that "As mobility of the LIPA PDN connection is not supported in this release of the specification, the LIPA PDN connection shall be released when the UE moves away from H(e)NB". In the procedures of FIG. 6, there is no corresponding restriction. Rather, the target eNB 21 may select a new LGW, i.e., the target LGW 31, and initiate setup of the direct tunnel. In scenarios with a one-to-one mapping between eNB and LGW the choice of the target LGW 31 is straightforward and given by the mapping of eNB to LGW. Similar considerations apply for scenarios with multiple eNBs per LGW. In scenarios with multiple LGWs per eNB, the eNB 21 could use a similar selection algorithm as used for selection of the MME, i.e. a weighted distribution based on a capacity parameter received from the MME 40 (the "Relative MME Capacity" IE in the S1 Setup Response message). Note that, when eNB and LGW are not co-located, there is no need to relocate the LGW upon every eNB-to-eNB handover. It may also happen that the target eNB 21 chooses the same LGW, i.e., keeps the source LGW 30. In that case, LGW re-location can be omitted, and only the direct tunnel may need to get updated.

Information about the target LGW 31 is then sent to the MME 40 in the path switch request 632. According to 3GPP TS 23.401, the MME 40 would send a path switch request failure message if the LIPA PDN connection was not released. In the procedure of FIG. 6, the MME 40 instead informs the SGW 50 about the target LGW 31 in the modify bearer request 633. This causes the SGW 50 to move the S5 bearer (i.e. GTP tunnel) from the source LGW 30 to target LGW 31. This also involves selection of an S5 TEID which is then sent back to the MME 40 in the modify bearer response 634. The value of the S5 TEID may be the same as before, but may also be different. In the path switch request acknowledgement 635, the MME 40 sends this piece of information (i.e., the S5 TEID) as correlation identifier back to the target eNB 21.

In the step 638 of removing the UE from the PIT, the context of the UE is removed from the PIT. The PIT can be seen as a list of entries, where each entry contains a name of an object and a list of interfaces that are interested in that object. Each UE may be represented by one or more interfaces. The step of removing may be performed in an implicit way. For example, if the interface for a UE is removed from the LGW, this may imply that the interface in the corresponding PIT entries is also removed. When the source LGW 30 receives the release resource command 637, it may immediately remove the entries from the PIT. In some scenarios, the source LGW 30 could also wait. For example, when a content object for the UE 10 is in-transit, removal of the entries may be suspended until the transit has completed. In this scenario, the forwarding of content between source eNB 20 and target eNB 21 may continue until the transit has completed (i.e. until the source LGW 30 has acknowledged the release resource command 637.

Accordingly, the following aspects are to be noted in the procedure of FIG. 6: One aspect is the handling of the PIT upon handover, in particular the request 614 to copy PIT entries, the copying itself as shown by message 615 and step 616, and the removing of PIT entries after copying, as shown by step 638. A further aspect is the handling of the target LGW 31. In particular, the target eNB 21 selects the target LGW 31 upon handover, sets up the direct tunnel at handover, and informs the MME 40 of the new LGW (i.e., the target LGW 31) in the path switch request 632.

In the procedures of FIG. 6, it is assumed that the LGW is either co-located with the eNB or that the LGW is stand-alone. In both cases, the target eNB 21 may select the target LGW 31. This may help to limit impact on the rest of the system. For example, in this case it doesn't really matter for the MME 40 whether the eNB 21 and LGW 31 are co-located or not. Also, the LGW 31 doesn't need to be involved in the path switch request and modify bearer request signaling. In the non-co-located case, there may be one dedicated LGW per eNB. But it is to be understood that the concepts illustrated herein are not restricted to such scenarios. For example, there could also be one LGW serving multiple eNBs, or even vice versa.

Figure 7:
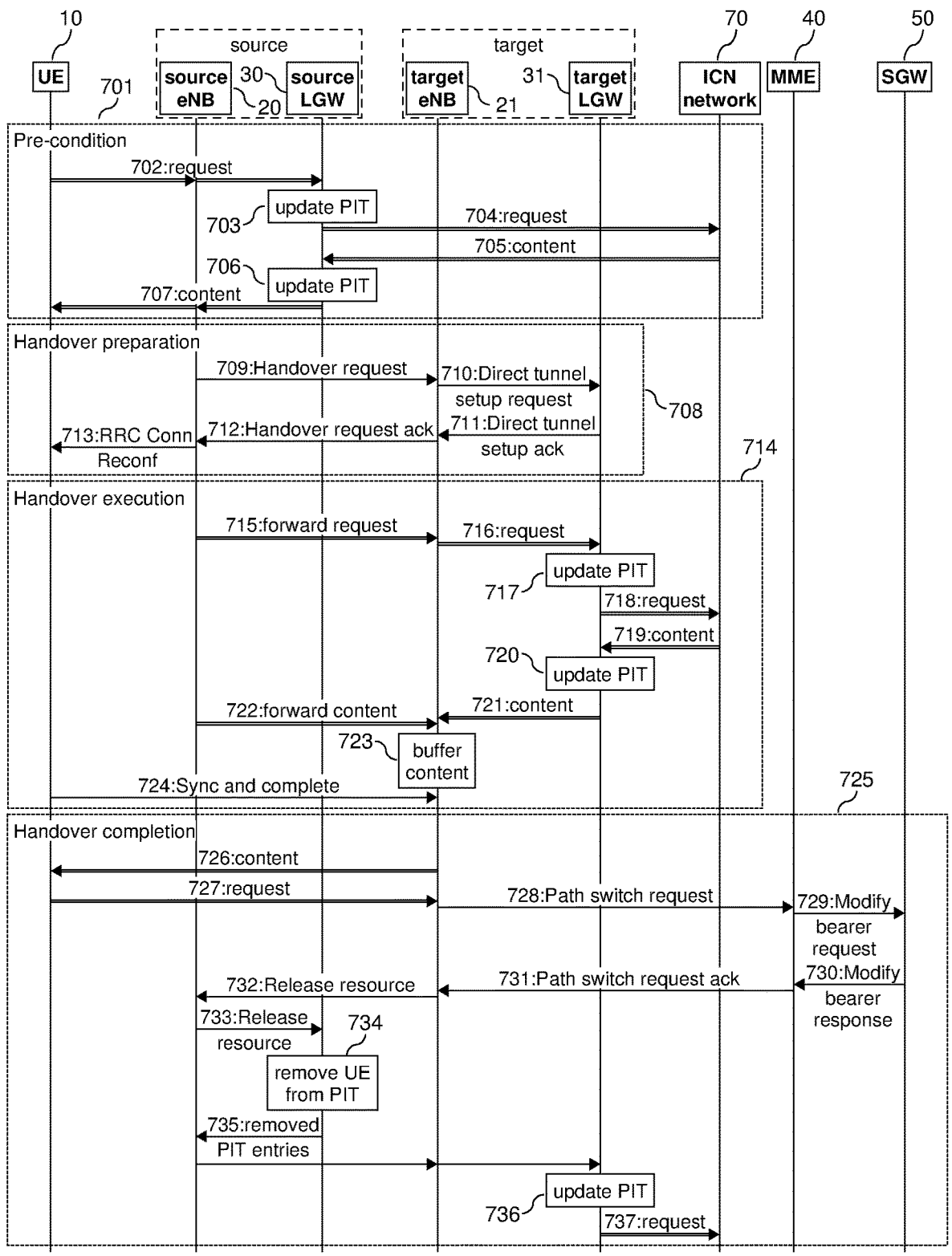

In the procedures of FIG. 6, the content may come out-of-order. This is no issue in ICN. Furthermore, it may happen that the UE 10 receives the same content twice: once from the source LGW 30, forwarded via the source eNB 20 and sent to the UE 10 by the target eNB 21; and a second time via the target LGW 31 as a result of the request that the target LGW 31 sent (in message 617), triggered by the copied PIT entry/entries that was/were transferred to the target LGW 31 (by message 615 and in step 616). This may result in a requirement on the UE 10 to perform duplicate detection. With reference to FIG. 7, now procedures will be described which may allow for avoiding duplicated delivery of content to the UE 10.

Similar to FIG. 6, FIG. 7 shows a UE mobility scenario based on assuming multiple ICN enabled LGWs, involving a UE 10, a source eNB 20, a source LGW, a target eNB 21, a target LGW, an MME 40, an SGW 50, a PGW 60, and an ICN network 70. The ICN network 70 may or example include multiple ICN nodes which are organized as explained in connection with FIGS. 2A-2F. Double-line arrows indicate user plane traffic. Also in this case, such user plane traffic is not mandatory and may occur according to user activity at the UE 10. Also in the scenario of FIG. 7, it is assumed that ICN/CCN functionalities are implemented at the LGWs, i.e., the source LGW 30 and the target LGW 31. That is to say, in this case the LGWs 30, 31 may implement functionalities of an ICN/CCN node as for example explained in connection with FIG. 1, such as receiving and forwarding ICN requests for data objects and maintaining a PIT.

The processes as illustrated in FIG. 7 assume as a precondition (as illustrated by block 701), that the UE 10 sends an ICN request 702 for content, which is received by the source eNB 20 and then forwarded to the source LGW 30. The source LGW 30 updates its PIT, as illustrated by block 703, and forwards the ICN request to the ICN network 70, as illustrated by message 604. The ICN network 70 responds with the requested content, as illustrated by message 705, the source LGW 30 updates its PIT, as illustrated by block 706, and the source LGW 30 forwards the content via the source eNB 20 to the UE 10.

The scenario of FIG. 7 further assumes that the UE 10 then moves from a coverage area of the source eNB 20 to a coverage area of the target eNB 21. This triggers a handover procedure, including a handover preparation phase, as illustrated by block 708. The handover preparation phase 708 is assumed to be based on the procedure as defined in 3GPP TS 36.300 V13.2.0 and includes that the source eNB 20 sends a handover request 709 to the target eNB 21. Further, the handover preparation phase 708 also involves setup of a connection is setup between the source LGW 30 and the target LGW 31. This includes setting up a direct tunnel between the target eNB 21 and the target LGW 31, which is initiated by the target eNB 21 sending a direct tunnel setup request 710 to the target LGW 31, to which the target LGW 31 responds with a direct tunnel setup acknowledgement 711. The connection between the source LGW 30 and the target LGW 31 thus extends via the source eNB 20 and the target eNB 21. The connection between the source LGW 30 and the target LGW 31 thus extends via the source eNB 20 and the target eNB 21. A temporary connection established between the source eNB 20 and the target eNB 21 during the handover procedure (via the X2 interface) is used as part of the connection. Further, in accordance with the procedure of 3GPP 36.300 V13.2.0, the target eNB 21 responds to the handover request 709 by sending a handover request acknowledgement 712 to the source eNB 20, and the source eNB 20 triggers handover of the UE 10 by sending an RRC Connection Reconfiguration message 713 to the UE 10.

The handover procedure of FIG. 7 then continues with a handover execution phase, as illustrated by block 714. As illustrated by message 715, during handover execution, an ICN request from the UE 10, may be forwarded from the source eNB 20 to the target eNB 21. The target eNB 21 may in turn forward the ICN request to the target LGW 31, as illustrated by message 716. The target LGW 31 updates its PIT, as illustrated by block 717, and forwards the ICN request to the ICN network 70, as illustrated by message 718. The ICN network 70 responds with the requested content, as illustrated by message 719, and the target LGW 31 may then again update its PIT, as illustrated by step 720. Further, the target LGW 31 forwards the received content to the target eNB 21, as illustrated by message 721. As further illustrated by message 722, during handover execution, content received by the source eNB 20 may be forwarded from the source eNB 20 to the target eNB 21. As illustrated by block 723, the target eNB 21 may then buffer this content for later delivery to the UE 10. As illustrated, the handover execution phase ends when the UE 10 sends a sync and complete message 724 to the target eNB 21, thereby indicating that the UE 10 is now synchronized and connected to the target eNB 21. Details of the handover execution phase 714 and its messages may be as specified in 3GPP TS 36.300 V13.2.0.

Further, the handover procedure of FIG. 7 includes a handover completion phase, as illustrated by block 725. As illustrated by message 726, during handover completion, the target eNB 21 may provide the received and forwarded content to the UE 10. Further, the UE 10 may send an ICN request 727 for content, which is now received by the target eNB 21 (and then forwarded to and handled by the target LGW 31). For completing the handover, the target eNB 21 sends a path switch request 728 to the MME 40. In response to the path switch request 728, the MME 40 sends a modify bearer request 729 to the SGW 50, and the SGW 50 responds with a modify bearer response 730. The MME 40 then responds to the path switch request 728 by sending a path switch request acknowledgement 731 to the target eNB 21, and the target eNB 21 sends a release resource command 732 to the source eNB 20, thereby triggering the source eNB 20 to release the resources associated with the PDN connection of the UE 10. As further illustrated, the source eNB 20 sends a resource release command 733 to the source LGW 30, thereby triggering the source LGW 30 to release the resources associated with the PDN connection of the UE 10. As illustrated by step 734, this releasing of the resources may include removing information associated with the UE 10 from the PIT of the source LGW 30. Here, it is noted that for this purpose one or more entries may be deleted completely from the PIT if there is no pending ICN requests for the corresponding content from another UE. Otherwise, only an association of the PIT entry with the UE 10, e.g., in terms of a UE identifier stored in the PIT, may be removed.

After removing the information associated with the UE 10 from its PIT, the source LGW 30 uses the connection to the target LGW 31 for sending the removed PIT entries and/or other information associated with the UE 10 to the target LGW 31, as illustrated by message 735. Having received this information, the target LGW 31 updates its PIT, as indicted by step 736 and may then re-send the ICN requests by the UE 10, such that the requested content will arrive at the target LGW 31, as indicated by message 737.

As can be seen, the procedures of FIG. 7 differ from the procedures of FIG. 6 in that the updating of the PIT of the target LGW 31 with the information from the source LGW 30 occurs at a later stage, after the context of the UE 10 has been removed from the PIT of the source LGW 30 and content forwarding from the source eNB 20 to the target eNB 21 has stopped. Accordingly, it can be avoided that the requested content is provided both to the source LGW 30 and to the target LGW 31 and then forwarded in duplicate to the UE 10. In some situations, shifting the requesting of the content to the later stage may however have the effect that content arrival may be later as in the procedures of FIG. 6.

As mentioned above, the path switch request acknowledgement message transmitted in the handover completion phase (i.e., the path switch request acknowledgement message 635 of FIG. 6 and the path switch request acknowledgement message 731 of FIG. 7 may be used to indicate a correlation identifier (based on the S5 TEID) to the target eNB 21. Such correlation identifier might in principle used for avoiding duplicated delivery of the same content to the UE 10. Specifically, the correlation identifier can be used to relate the particular user (i.e., the UE 10) to its S5 LGW-SGW tunnel. However, in the procedures of FIGS. 6 and 7 such utilization of the correlation identifier is not really possible, because the eNB-LGW direct tunnel has already been setup before the correlation identifier is received. In other words, the target eNB 21 may need another means (another correlation identifier) to relate the direct tunnel to the particular user. An example of such other correlation identifier would be a radio bearer ID or some other unique UE identification like a (temporary) IMSI. To use the correlation identifier received in the path switch request acknowledgement message, the procedures of FIG. 6 or 7 may be slightly modified. An example of such modified procedures is shown in FIG. 8.

Figure 8:
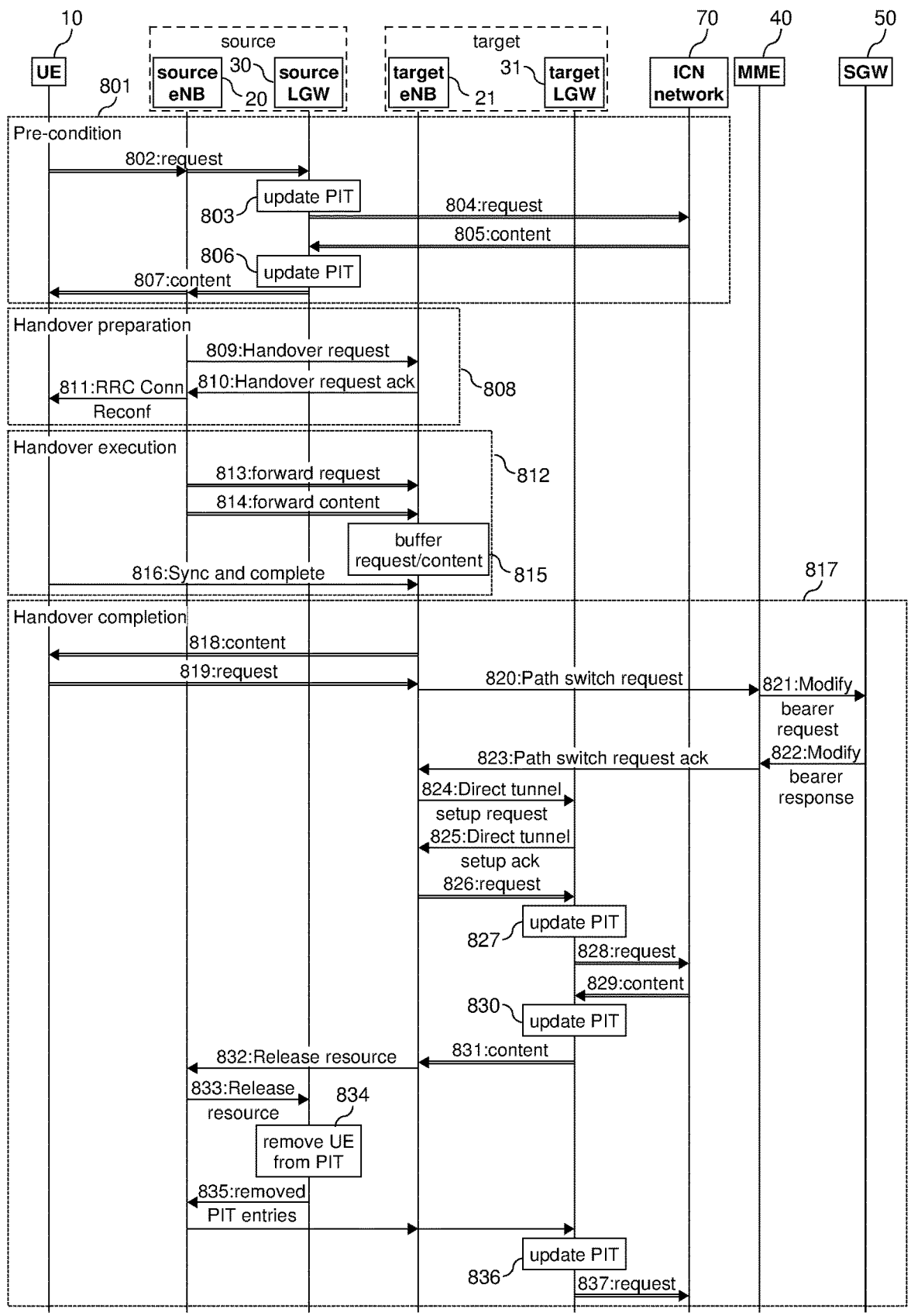

Similar to FIGS. 6 and 7, FIG. 8 shows a UE mobility scenario based on assuming multiple ICN enabled LGWs, involving a UE 10, a source eNB 20, a source LGW, a target eNB 21, a target LGW, an MME 40, an SGW 50, a PGW 60, and an ICN network 70. The ICN network 70 may or example include multiple ICN nodes which are organized as explained in connection with FIGS. 2A-2F. Double-line arrows indicate user plane traffic. Also in this case, such user plane traffic is not mandatory and may occur according to user activity at the UE 10. Also in the scenario of FIG. 8, it is assumed that ICN/CCN functionalities are implemented at the LGWs, i.e., the source LGW 30 and the target LGW 31. That is to say, in this case the LGWs 30, 31 may implement functionalities of an ICN/CCN node as for example explained in connection with FIG. 1, such as receiving and forwarding ICN requests for data objects and maintaining a PIT.

The processes as illustrated in FIG. 8 assume as a precondition (as illustrated by block 801), that the UE 10 sends an ICN request 802 for content, which is received by the source eNB 20 and then forwarded to the source LGW 30. The source LGW 30 updates its PIT, as illustrated by block 803, and forwards the ICN request to the ICN network 70, as illustrated by message 804. The ICN network 70 responds with the requested content, as illustrated by message 805, the source LGW 30 updates its PIT, as illustrated by block 806, and the source LGW 30 forwards the content via the source eNB 20 to the UE 10.

The scenario of FIG. 8 further assumes that the UE 10 then moves from a coverage area of the source eNB 20 to a coverage area of the target eNB 21. This triggers a handover procedure, including a handover preparation phase, as illustrated by block 808. The handover preparation phase 808 is assumed to be based on the procedure as defined in 3GPP TS 36.300 V13.2.0 and includes that the source eNB 20 sends a handover request 809 to the target eNB 21. Further, in accordance with the procedure of 3GPP 36.300 V13.2.0, the target eNB 21 responds to the handover request 809 by sending a handover request acknowledgement 810 to the source eNB 20, and the source eNB 20 triggers handover of the UE 10 by sending an RRC Connection Reconfiguration message 811 to the UE 10.

The handover procedure of FIG. 8 then continues with a handover execution phase, as illustrated by block 812. As illustrated by message 813 and 814, during handover execution, an ICN request from the UE 10 and/or content may be forwarded from the source eNB 20 to the target eNB 21. The target eNB 21 may then buffer such requests and/or content for later delivery, as illustrated by step 815. As illustrated, the handover execution phase ends when the UE 10 sends a sync and complete message 816 to the target eNB 21, thereby indicating that the UE 10 is now synchronized and connected to the target eNB 21. Details of the handover execution phase 812 and its messages may be as specified in 3GPP TS 36.300 V13.2.0.

Further, the handover procedure of FIG. 8 includes a handover completion phase, as illustrated by block 817. As illustrated by message 818, during handover completion, the target eNB 21 may provide the forwarded content to the UE 10. Further, the UE 10 may send an ICN request 819 for content, which is now received by the target eNB 21 (and then forwarded to and handled by the target LGW 31). For completing the handover, the target eNB 21 sends a path switch request 820 to the MME 40. In response to the path switch request 820, the MME 40 sends a modify bearer request 821 to the SGW 50, and the SGW 50 responds with a modify bearer response 822. The MME 40 then responds to the path switch request 820 by sending a path switch request acknowledgement 823 to the target eNB 21. At this point, the target eNB 21 initiates setup of a connection between the source LGW 30 and the target LGW 31. This includes setting up a direct tunnel between the target eNB 21 and the target LGW 31, which is initiated by the target eNB 21 sending a direct tunnel setup request 824 to the target LGW 31, to which the target LGW 31 responds with a direct tunnel setup acknowledgement 825. The connection between the source LGW 30 and the target LGW 31 thus extends via the source eNB 20 and the target eNB 21. The connection between the source LGW 30 and the target LGW 31 thus extends via the source eNB 20 and the target eNB 21. A temporary connection established between the source eNB 20 and the target eNB 21 during the handover procedure (via the X2 interface) is used as part of the connection.

After setting up the direct tunnel, the target eNB 21 proceeds with forwarding the ICN request received with message 813 or message 819 to the target LGW 31, as illustrated by message 826. The target LGW 31 updates its PIT, as illustrated by block 827, and forwards the ICN request to the ICN network 70, as illustrated by message 828. The ICN network 70 responds with the requested content, as illustrated by message 829, and the target LGW 31 may then again update its PIT, as illustrated by step 830. Further, the target LGW 31 forwards the received content to the target eNB 21, as illustrated by message 831.

The target eNB 21 then sends a release resource command 832 to the source eNB 20, thereby triggering the source eNB 20 to release the resources associated with the PDN connection of the UE 10. As further illustrated, the source eNB 20 sends a resource release command 833 to the source LGW 30, thereby triggering the source LGW 30 to release the resources associated with the PDN connection of the UE 10. As illustrated by step 834, this releasing of the resources may include removing information associated with the UE 10 from the PIT of the source LGW 30. Here, it is noted that for this purpose one or more entries may be deleted completely from the PIT if there is no pending ICN requests for the corresponding content from another UE. Otherwise, only an association of the PIT entry with the UE 10, e.g., in terms of a UE identifier stored in the PIT, may be removed.

After removing the information associated with the UE 10 from its PIT, the source LGW 30 uses the connection to the target LGW 31 for sending the removed PIT entries and/or other information associated with the UE 10 to the target LGW 31, as illustrated by message 835. Having received this information, the target LGW 31 updates its PIT, as indicted by step 836 and may then re-send the ICN requests by the UE 10, such that the requested content will arrive at the target LGW 31, as indicated by message 837.

As can be seen, the procedures of FIG. 8 differ from the procedures of FIGS. 6 and 7 in that the setup of the connection between the source LGW 30 and the target LGW 31 occurs at a later stage, after path switching from the source LGW 30 to the target LGW 31. The S5 TEID assigned during path switching is known when setting up the direct tunnel and can be used for identifying content which is received in duplicate by the target LGW 31, as content forwarded from the source eNB 20 and as content received in response to the request issued with message 828 to the ICN network. As can be seen, the late updating of the PIT of the target LGW 31 with the information from the source LGW 30 as used in the procedures of FIG. 7 may also be used in the procedures of FIG. 8 to avoid content duplication due to re-sending of ICN requests. It is noted that the alignment of the PITs could also be based on procedures as explained in connection with FIG. 6, where the PITs are aligned at an earlier stage, substantially immediately after setting up the connection between the source LGW 30 and the target LGW 31.

In the procedures of FIGS. 6 to 8, it was assumed that the target LGW 31 is selected by the target eNB 21. However, other variants of selecting the target LGW 31 may be utilized as well. For example, the target LGW 31 may be selected by the MME 40. This may be useful if the LGW is not co-located with the eNB (and more than one LGW can serve a certain eNB) and the operator wants a more centralized control of the LGW selection. An example of corresponding procedures is illustrated in FIG. 9.

Similar to FIGS. 6, 7 and 8, FIG. 9 shows a UE mobility scenario based on assuming multiple ICN enabled LGWs, involving a UE 10, a source eNB 20, a source LGW, a target eNB 21, a target LGW, an MME 40, an SGW 50, a PGW 60, and an ICN network 70. The ICN network 70 may for example include multiple ICN nodes which are organized as explained in connection with FIGS. 2A-2F. Double-line arrows indicate user plane traffic. Also in this case, such user plane traffic is not mandatory and may occur according to user activity at the UE 10. Also in the scenario of FIG. 8, it is assumed that ICN/CCN functionalities are implemented at the LGWs, i.e., the source LGW 30 and the target LGW 31. That is to say, in this case the LGWs 30, 31 may implement functionalities of an ICN/CCN node as for example explained in connection with FIG. 1, such as receiving and forwarding ICN requests for data objects and maintaining a PIT.

Figure 9:
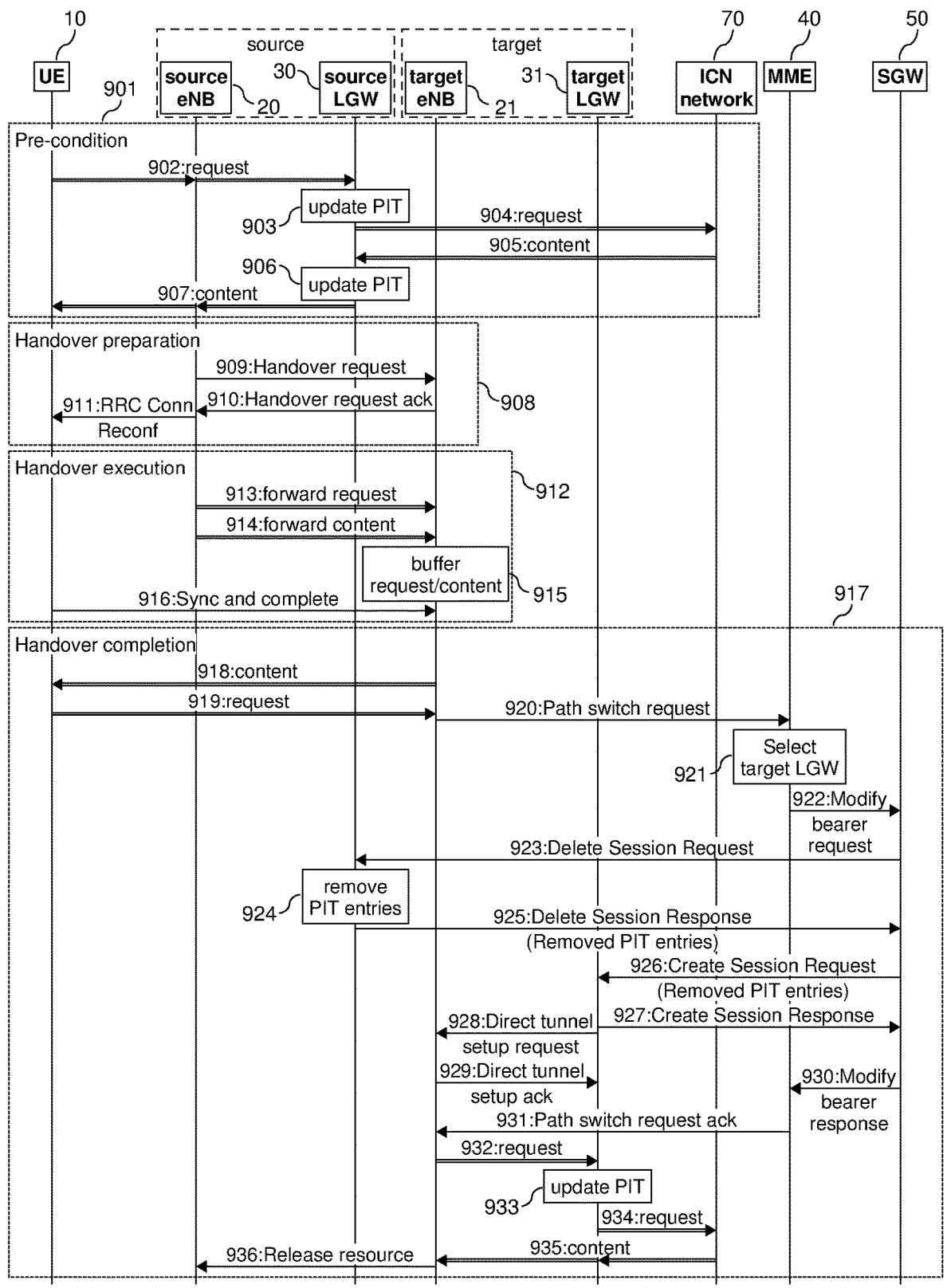

The processes as illustrated in FIG. 9 assume as a precondition (as illustrated by block 901), that the UE 10 sends an ICN request 902 for content, which is received by the source eNB 20 and then forwarded to the source LGW 30. The source LGW 30 updates its PIT, as illustrated by block 903, and forwards the ICN request to the ICN network 70, as illustrated by message 904. The ICN network 70 responds with the requested content, as illustrated by message 905, the source LGW 30 updates its PIT, as illustrated by block 906, and the source LGW 30 forwards the content via the source eNB 20 to the UE 10.

The scenario of FIG. 9 further assumes that the UE 10 then moves from a coverage area of the source eNB 20 to a coverage area of the target eNB 21. This triggers a handover procedure, including a handover preparation phase, as illustrated by block 908. The handover preparation phase 908 is assumed to be based on the procedure as defined in 3GPP TS 36.300 V13.2.0 and includes that the source eNB 20 sends a handover request 909 to the target eNB 21. Further, in accordance with the procedure of 3GPP 36.300 V13.2.0, the target eNB 21 responds to the handover request 909 by sending a handover request acknowledgement 810 to the source eNB 20, and the source eNB 20 triggers handover of the UE 10 by sending an RRC Connection Reconfiguration message 911 to the UE 10.

The handover procedure of FIG. 9 then continues with a handover execution phase, as illustrated by block 912. As illustrated by message 913 and 914, during handover execution, an ICN request from the UE 10 and/or content may be forwarded from the source eNB 20 to the target eNB 21. The target eNB 21 may then buffer such requests and/or content for later delivery, as illustrated by step 915. As illustrated, the handover execution phase ends when the UE 10 sends a sync and complete message 916 to the target eNB 21, thereby indicating that the UE 10 is now synchronized and connected to the target eNB 21. Details of the handover execution phase 912 and its messages may be as specified in 3GPP TS 36.300 V13.2.0.

Further, the handover procedure of FIG. 9 includes a handover completion phase, as illustrated by block 917. As illustrated by message 918, during handover completion, the target eNB 21 may provide the forwarded content to the UE 10. Further, the UE 10 may send an ICN request 919 for content, which is now received by the target eNB 21. For completing the handover, the target eNB 21 sends a path switch request 920 to the MME 40. In response to the path switch request 920, the MME 40 selects the target LGW 31 from a plurality of candidate LGWs, as illustrated by step 921. The selection may be based on rules configured in the MME 40. For example, the selection can be based on information on network topology and/or location of the UE 10. Having selected the target LGW 31, the MME 40 sends a modify bearer request 922 to the SGW 50.

As illustrated, in response to receiving the modify bearer request 922, the SGW 50 may initiate deletion of S5 tunnel sessions associated with the UE 10 at the source LGW 30. In the example of FIG. 9, this involves that the SGW 50 sends a delete session request 923 to the source LGW 30. Upon receiving the delete session request 923, the source LGW 30 may remove PIT entries associated with the UE 10 from its PIT, as illustrated by step 924. The source LGW 30 may then respond to the delete session request 923 by sending a delete session response 925 to the SGW 50. The delete session response 925 may include the removed PIT entries and/or other information associated with the UE 10, to be used for updating the PIT of the target LGW 31.

The SGW 50 may then proceed by creating an S5 tunnel session for the UE 10 at the target LGW 31. In the example of FIG. 9, this involves that the SGW 50 sends a create session request 926 to the target LGW 31. As illustrated, the create session request 926 may include the removed PIT entries and/or other information associated with the UE 10. The target LGW 31 may then respond to the create session request 926 by sending a create session response 927 to the SGW 50.

As can be seen, messages for management of the S5 tunnel are in this case utilized for conveying information used in the alignment of the PITs.

The target LGW 31 then initiates setup of a connection between the source LGW 30 and the target LGW 31. This includes setting up a direct tunnel between the target eNB 21 and the target LGW 31, which is initiated by the target LGW 31 sending a direct tunnel setup request 928 to the target eNB 21, to which the target eNB 21 responds with a direct tunnel setup acknowledgement 929.

The SGW 50 then responds to the modify bearer request 923 by sending a modify bearer response 930 to the MME 40. The MME 40 then responds to the path switch request 920 by sending a path switch request acknowledgement 931 to the target eNB 21.

After setting up the direct tunnel, the target eNB 21 proceeds with forwarding the ICN request(s) received with message 913 or message 919 to the target LGW 31, as illustrated by message 932. The target LGW 31 updates its PIT, as illustrated by block 933, and forwards the ICN request to the ICN network 70, as illustrated by message 934. This updating of the PIT and re-sending of ICN requests may also consider the information from the source LGW 30 as received with the create session request 926. The ICN network 70 responds with the requested content which is forwarded by the target LGW 31 to the target eNB 21, as illustrated by step 935. The target eNB 21 then sends a release resource command 936 to the source eNB 20, thereby triggering the source eNB 20 to release the resources associated with the PDN connection of the UE 10.

As can be seen, in the procedures of FIG. 9 the information used for aligning the PITs of the source LGW 30 and the target LGW with the handover of the UE 10 is piggybacked on other signaling, in particular the delete session/create session signaling by the SGW 50. However, it is noted that other ways of aligning the PITs could be used as well, e.g., PIT copying triggered by the release resource signaling as described in the procedure of FIGS. 7 and 8 or PIT copying after direct tunnel setup as described in the procedure of FIG. 6.

Further, the procedures of FIG. 9 differ from the procedures of FIGS. 6 to 8 in that the setup of the direct tunnel between the source LGW 30 and the target LGW 31 is initiated by the target LGW 31, i.e., the direct tunnel is setup from the LGW side. However, it is noted that other ways of triggering setup of the direct tunnel could be used as well, e.g., setup of the direct tunnel from the eNB side, after the eNB receiving the patch switch request acknowledgement message, such as in the case of the procedures of FIG. 8, where setup of the direct tunnel is initiated by the target eNB 21 in response to receiving the path switch request acknowledgement message 823.

Further, it is noted that MME-based selection of the LGW as illustrated by FIG. 9 may also be used in other scenarios than handover scenarios. For example, upon initial attach of the UE 40, the MME 40 could use a similar way of selecting the LGW.

Figure 10:
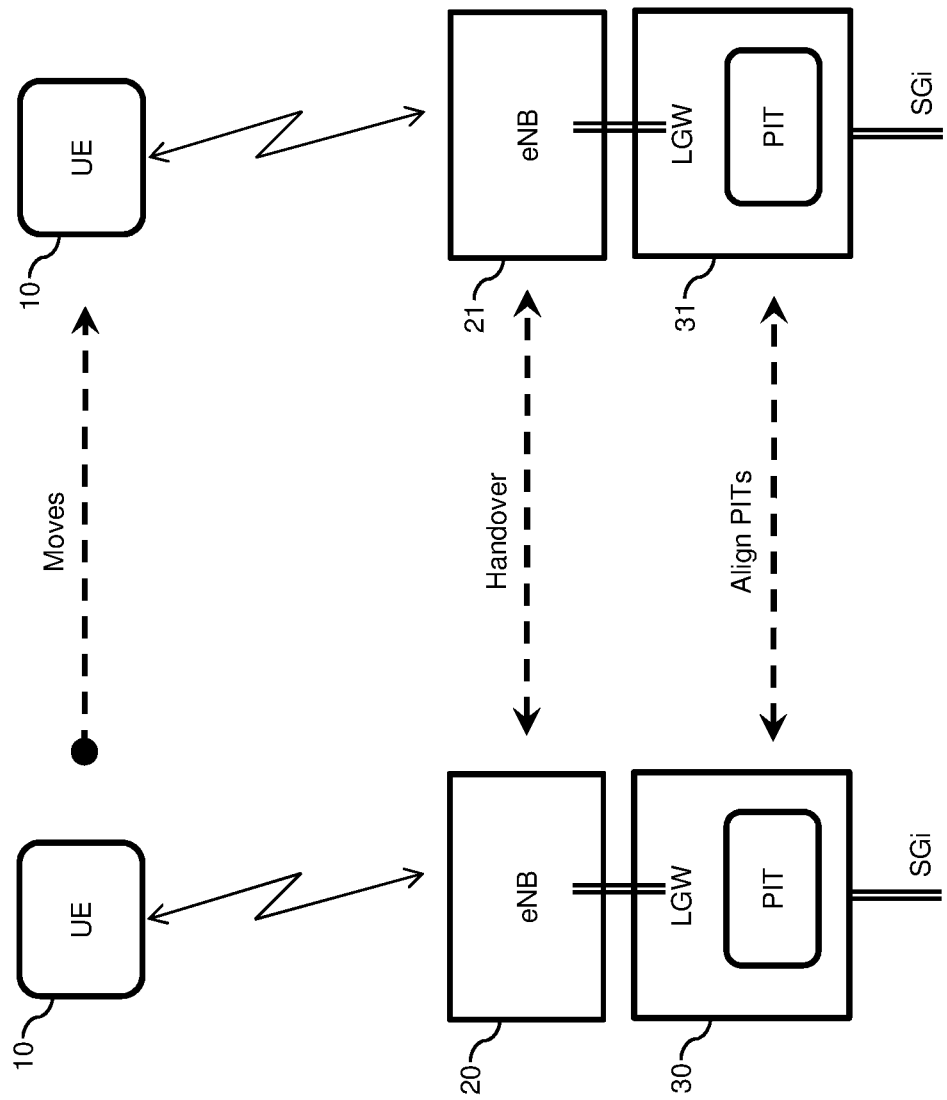
FIG. 10 shows schematically illustrates PIT alignment according to an embodiment of the invention.

FIG. 10 schematically illustrates a system in which the above procedures may be implemented. As illustrated, the system includes the UE 10, the source eNB 20, the source LGW 30, the target eNB 21, and the target LGW 31. The UE 10 moves from the coverage area of the source eNB 20 to the coverage area of the target eNB 21. The source eNB 20 and the target eNB 21 then perform a procedure for handover of the UE 10 from the source eNB 21 to the target eNB 21. The handover procedure initiates alignment of the PIT maintained by the target LGW 31 (the target PIT) with the PIT maintained by the source LGW 30 (the source PIT). Alignment of the PITs may include removal of entries or other information from the source PIT, copying of entries or other information from the source PIT to the target PIT, and/or updating of entries or other information in the target PIT based on information from the source PIT. The alignment may involve transmission of information on a tunnel or other connection between the source LGW and the target LGW.

Figure 11:
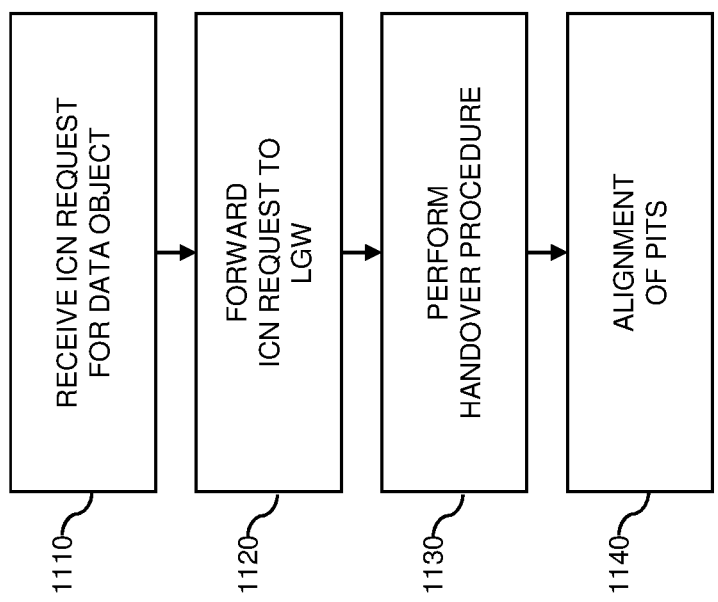
FIG. 11 shows a flowchart for schematically illustrating a method performed by an access node according to an embodiment of the invention, acting as a source access node of a handover.

FIG. 11 shows a flowchart for illustrating a method of conveying data in a cellular network. The method of FIG. 11 may be utilized for implementing the illustrated concepts in an access node of the cellular network, which acts as a source node in mobility of a UE, such as the above-mentioned source eNB 20. If a processor-based implementation of the access node is used, the steps of the method may be performed by one or more processors of the access node. In such a case the access node may further comprise a memory in which program code for implementing the below described functionalities is stored.

At step 1110, the access node (source access node) of the cellular network receives an ICN request for a data object. The ICN request is received from a UE, such as the UE 10, in a coverage area of the access node. In accordance with ICN principles, the ICN request identifies the data object by a name and is not addressed to a specific source of the data object. The ICN request may for example be an Interest message according to the CCNx specifications.

At step 1120, the access node forwards the ICN request to a local gateway (source local gateway) associated with the access node. The local gateway may be collocated with the access node or otherwise be arranged close to the access node. For example, the local gateway may be included together with the access node in a RAN (Radio Access Network) part of the cellular network. An example of such local gateway is the above-mentioned source LGW 30. The local gateway maintains a PIT (source PIT). The PIT includes an entry for each data object having a pending ICN request at the local gateway, e.g., an entry for the ICN request received at step 1110 and forwarded at step 1120.

At step 1130, the access node performs a handover procedure. This is accomplished in response to the UE moving from the coverage area of the access node to a coverage area of a further access node (target access node), such as the above-mentioned target eNB 21. The further access node is associated with a further local gateway (target local gateway). The further local gateway may be collocated with the further access node or otherwise be arranged close to the further access node. For example, the further local gateway may be included together with the further access node in a RAN part of the cellular network. An example of such further local gateway is the above-mentioned target LGW 31. The further local gateway maintains a further PIT (target PIT). The further PIT includes an entry for each data object having a pending ICN request at the further local gateway. The handover procedure may be based on interaction of the access node and the further access node, as for example illustrated in FIGS. 6 to 9. The handover procedure may include a handover preparation phase, a handover execution phase, and a handover completion phase.

The further local gateway may be selected by the further access node. Examples of procedures in which the target local gateway is selected by the target access node are shown in FIGS. 6 to 8, where the target eNB 21 selects the target LGW 31. Alternatively, the further local gateway may be selected by a mobility control node associated with the further access node, e.g., by an MME. An example of procedures in which the target local gateway is selected by a mobility control node is shown in FIG. 9, where the MME 40 selects the target LGW 31.

At step 1140, alignment of the further PIT and the PIT with respect to at least one entry associated with the UE is performed. The alignment of the PITs is initiated by the handover procedure. For example, the handover procedure may be used for setting up a connection between the local gateway and the further local gateway, and this connection may then be used for conveying information for aligning the PITs. The connection may include the above-mentioned direct tunnel between eNB and LGW and/or a tunnel between source local gateway and target local gateway, e.g., extending via the source access node and the target access node. The conveyed information may for example include one or more PIT entries removed from the source PIT and to be included into the target PIT. Accordingly, the alignment of the PIT and the further PIT may involve deleting at least one entry associated with the UE from the source PIT. In addition or as an alternative, wherein the alignment of the PIT and the further PIT may involve copying at least one entry associated with the UE from the source PIT to the target PIT. Further, the alignment of the PIT and the further PIT may involve updating at least one entry of the target PIT with information from at least one entry of the source PIT associated with the UE. Further, the alignment of the PIT and the further PIT may involve transmission of information on at least one entry of the PIT and/or of the further PIT (e.g., transmission of one or more PIT entries or UE context information associated with such PIT entries. For example, such information may be transmitted via the above-mentioned direct tunnel and/or a temporary connection between source access node and target access node. Further, the information could be piggybacked, i.e., inserted into one or messages of the handover procedure, such as shown in the example of FIG. 9. The source local gateway may send the information and the target local gateway may receive the information. The alignment of the PIT and the further PIT may be based on identifying the target local gateway based on a tunnel identifier assigned during the handover procedure, e.g., an S5 TEID. This tunnel identifier may for example be used for setting up the connection between the local gateway and the further local gateway.

The further local gateway may be selected by the further access node. Examples of procedures in which the target local gateway is selected by the target access node are shown in FIGS. 6 to 8. Alternatively, the further local gateway may be selected by a mobility control node associated with the further access node, e.g., by an MME. An example of procedures in which the target local gateway is selected by a mobility control node is shown in FIG. 9, where the MME 40 selects the target LGW 31.

Figure 12:
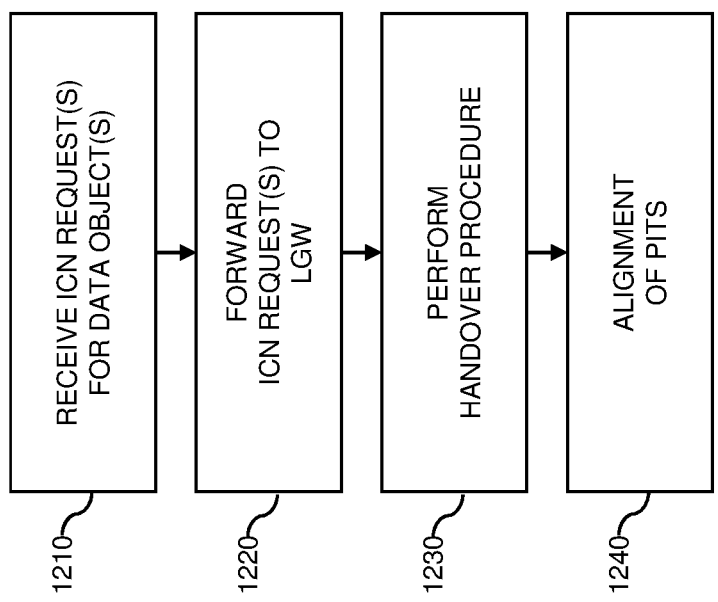
FIG. 12 shows a flowchart for schematically illustrating a further method performed by an access node according to an embodiment of the invention, acting as a target access node of a handover.

FIG. 12 shows a flowchart for illustrating a method of conveying data in a cellular network. The method of FIG. 12 may be utilized for implementing the illustrated concepts in an access node of the cellular network, which acts as a target node in mobility of a UE, such as the above-mentioned target eNB 21. If a processor-based implementation of the access node is used, the steps of the method may be performed by one or more processors of the access node. In such a case the access node may further comprise a memory in which program code for implementing the below described functionalities is stored.

At optional step 1210, the access node (target access node) of the cellular network may receive one or more ICN requests for a data object. The ICN requests are received from one or more UEs in a coverage area of the access node. In accordance with ICN principles, such ICN request identifies the data object by a name and is not addressed to a specific source of the data object. The ICN request may for example be an Interest message according to the CCNx specifications.

At optional step 1220, the access node forwards the ICN requests received at step 1210 to a local gateway (target local gateway) associated with the access node. The local gateway may be collocated with the access node or otherwise be arranged close to the access node. For example, the local gateway may be included together with the access node in a RAN part of the cellular network. An example of such local gateway is the above-mentioned target LGW 31. The local gateway maintains a PIT (target PIT). The PIT includes an entry for each data object having a pending ICN request at the local gateway, e.g., an entry for one or more of the ICN requests received at step 1210 and forwarded at step 1220.

The local gateway may be selected by the access node. Examples of procedures in which the target local gateway is selected by the target access node are shown in FIGS. 6 to 8, where the target eNB 21 may select the target LGW 31. Alternatively, the local gateway may be selected by a mobility control node associated with the access node, e.g., by an MME. An example of procedures in which the target local gateway is selected by a mobility control node is shown in FIG. 9, where the MME 40 selects the target LGW 31.

At step 1230, access node performs a handover procedure. This is accomplished in response to the UE moving from the coverage area of a further access node (source access node), such as the above-mentioned source eNB 20, to the coverage area of the access node (target access node). The further access node is associated with a further local gateway (source local gateway). The further local gateway may be collocated with the further access node or otherwise be arranged close to the further access node. For example, the further local gateway may be included together with the further access node in a RAN part of the cellular network. An example of such further local gateway is the above-mentioned source LGW 30. The further local gateway maintains a further PIT (source PIT). The further PIT includes an entry for each data object having a pending ICN request at the further local gateway. The handover procedure may be based on interaction of the access node and the further access node, as for example illustrated in FIGS. 6 to 9. The handover procedure may include a handover preparation phase, a handover execution phase, and a handover completion phase.

At step 1240, alignment of the further PIT and the PIT with respect to at least one entry associated with the UE is performed. The alignment of the PITs is initiated by the handover procedure. For example, the handover procedure may be used for setting up a connection between the local gateway and the further local gateway, and this connection may then be used for conveying information for aligning the PITs. The connection may include the above-mentioned direct tunnel between eNB and LGW and/or a tunnel between source local gateway and target local gateway, e.g., extending via the source access node and the target access node. The conveyed information may for example include one or more PIT entries removed from the source PIT and to be included into the target PIT. Accordingly, the alignment of the PIT and the further PIT may involve deleting at least one entry associated with the UE from the source PIT. In addition or as an alternative, wherein the alignment of the PIT and the further PIT may involve copying at least one entry associated with the UE from the source PIT to the target PIT. Further, the alignment of the PIT and the further PIT may involve updating at least one entry of the target PIT with information from at least one entry of the source PIT associated with the UE. Further, the alignment of the PIT and the further PIT may involve transmission of information on at least one entry of the PIT and/or of the further PIT (e.g., transmission of one or more PIT entries or UE context information associated with such PIT entries. For example, such information may be transmitted via the above-mentioned direct tunnel and/or a temporary connection between source access node and target access node. Further, the information could be piggybacked, i.e., inserted into one or messages of the handover procedure, such as shown in the example of FIG. 9. The source local gateway may send the information and the target local gateway may receive the information. The alignment of the PIT and the further PIT may be based on identifying the target local gateway based on a tunnel identifier assigned during the handover procedure, e.g., an S5 TEID. This tunnel identifier may for example be used for setting up the connection between the local gateway and the further local gateway.

It is noted that the methods of FIGS. 11 and 12 may also be combined. For example, the methods may be combined in a system which includes, at least, a source access node operating according to the method of FIG. 11 and a target access node operating according to FIG. 12. Further, the methods may also be combined in the same access node which acts as a source access node according to the method of FIG. 11 in a first handover and as a target access node according to the method of FIG. 12 in a second handover.

Figure 13:
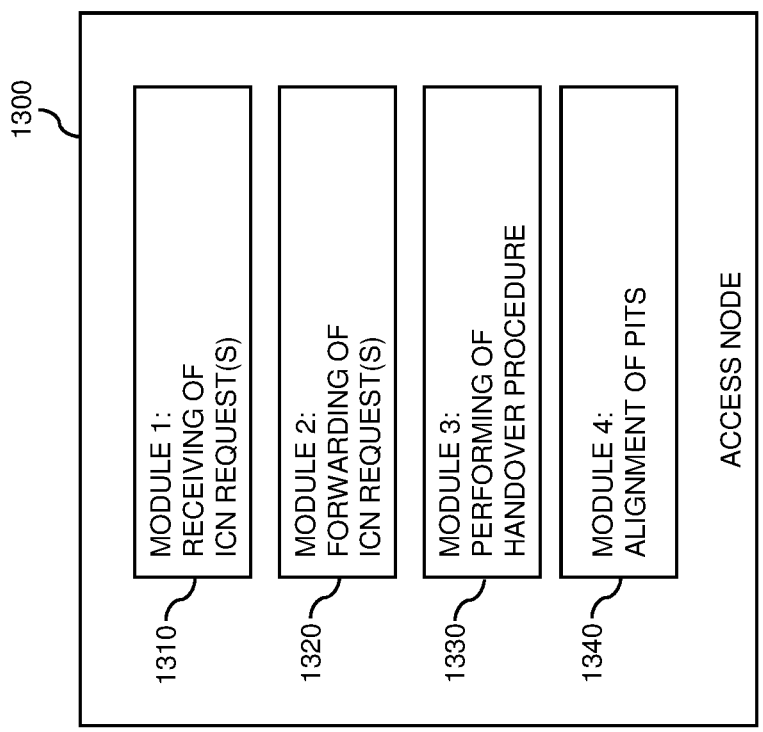
FIG. 13 shows a block diagram for illustrating functionalities of an access node according to an embodiment of the invention.

FIG. 13 shows a block diagram for illustrating functionalities of an access node 1300 which operates according to the method of FIG. 11 and/or according to the method of FIG. 12. As illustrated, the access node 1300 may be provided with a module 1310 configured to receive one or more ICN requests from one or more UEs, such as explained in connection with step 1110 and/or step 1210. Further, the access node 1300 may be provided with a module 1220 configured to forward the ICN request(s) to a local gateway, such as explained in connection with step 1120 and/or step 1220. Further, the access node 1300 may be provided with a module 1330 configured to perform a handover procedure, such as explained in connection with step 1130 and/or step 1230. Further, the access node 1300 may be provided with a module 1340 configured to perform alignment of PITs, such as explained in connection with step 1140 and/or step 1240.

It is noted that the access node 1300 may include further modules for implementing other functionalities, such as known functionalities of an eNB. Further, it is noted that the modules of the access node 1300 do not necessarily represent a hardware structure of the access node 1300, but may also correspond to functional elements, e.g., implemented by hardware, software, or a combination thereof.

Figure 14:
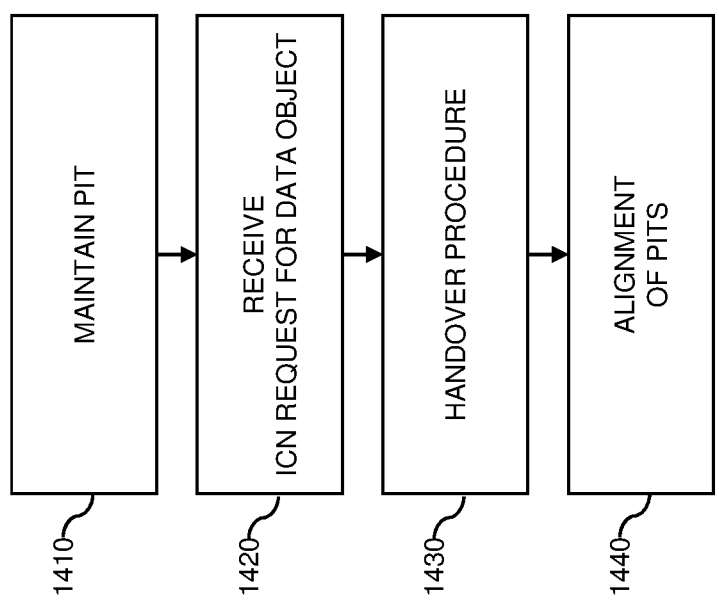
FIG. 14 shows a flowchart for schematically illustrating a method performed by a local gateway according to an embodiment of the invention, the local gateway being associated with a source access node of a handover.

FIG. 14 shows a flowchart for illustrating a method of conveying data in a cellular network. The method of FIG. 14 may be utilized for implementing the illustrated concepts in a local gateway of the cellular network, which is associated with an access node acting as a source node in mobility of a UE, such as the above-mentioned source LGW 30 which is associated with the source eNB 20. The local gateway may be collocated with the access node or otherwise be arranged close to the access node. For example, the local gateway may be included together with the access node in a RAN part of the cellular network. If a processor-based implementation of the local gateway is used, the steps of the method may be performed by one or more processors of the local gateway. In such a case the local gateway may further comprise a memory in which program code for implementing the below described functionalities is stored.

At step 1410, the local gateway (source local gateway) maintains a PIT (source PIT). The PIT includes an entry for each data object having a pending ICN request at the local gateway.

At step 1420, the local gateway receives at last one ICN request of a UE (e.g., the UE 10) for a data object. The at least one ICN request is received from the access node the local gateway is associated with. In accordance with ICN principles, such ICN request identifies the data object by a name and is not addressed to a specific source of the data object. The ICN request may for example be an Interest message according to the CCNx specifications. Based on the received ICN request, the local gateway may update the PIT.

At step 1430, the UE moves from a coverage area of the access node to a coverage area of a further access node (target access node), associated with a further local gateway (target local gateway) and, in response to this movement of the UE, a handover procedure of the UE from the access node to the further access node is performed. The further local gateway may be collocated with the further access node or otherwise be arranged close to the further access node. For example, the further local gateway may be included together with the further access node in a RAN part of the cellular network. An example of such further access node and further local gateway is given by the above-mentioned target eNB 21 and target LGW 31. The further local gateway maintains a further PIT (target PIT). The further PIT includes an entry for each data object having a pending ICN request at the further local gateway. The handover procedure may be based on interaction of the access node and the further access node, as for example illustrated in FIGS. 6 to 9. The handover procedure may include a handover preparation phase, a handover execution phase, and a handover completion phase.

The further local gateway may be selected by the further access node. Examples of procedures in which the target local gateway is selected by the target access node are shown in FIGS. 6 to 8, where the target eNB 21 may select the target LGW 31. Alternatively, the further local gateway may be selected by a mobility control node associated with the further access node, e.g., by an MME. An example of procedures in which the target local gateway is selected by a mobility control node is shown in FIG. 9, where the MME 40 selects the target LGW 31.

At step 1440, the local gateway performs alignment of the PIT and the further PIT with respect to at least one entry associated with the UE. This alignment of the PIT and the further PIT is initiated by the handover procedure of step 1430. For example, the handover procedure may be used for setting up a connection between the local gateway and the further local gateway, and this connection may then be used for conveying information for aligning the PITs. The connection may include the above-mentioned direct tunnel between eNB and LGW and/or a tunnel between source local gateway and target local gateway, e.g., extending via the source access node and the target access node. The conveyed information may for example include one or more PIT entries removed from the source PIT and to be included into the target PIT. Accordingly, the alignment of the PIT and the further PIT may involve deleting at least one entry associated with the UE from the source PIT. In addition or as an alternative, wherein the alignment of the PIT and the further PIT may involve copying at least one entry associated with the UE from the source PIT to the target PIT. Further, the alignment of the PIT and the further PIT may involve updating at least one entry of the target PIT with information from at least one entry of the source PIT associated with the UE. Further, the alignment of the PIT and the further PIT may involve transmission of information on at least one entry of the PIT and/or of the further PIT (e.g., transmission of one or more PIT entries or UE context information associated with such PIT entries. For example, such information may be transmitted via the above-mentioned direct tunnel and/or a temporary connection between source access node and target access node. Further, the information could be piggybacked, i.e., inserted into one or messages of the handover procedure, such as shown in the example of FIG. 9. The source local gateway may send the information and the target local gateway may receive the information. The alignment of the PIT and the further PIT may be based on identifying the target local gateway based on a tunnel identifier assigned during the handover procedure, e.g., an S5 TEID. This tunnel identifier may for example be used for setting up the connection between the local gateway and the further local gateway.

Figure 15:
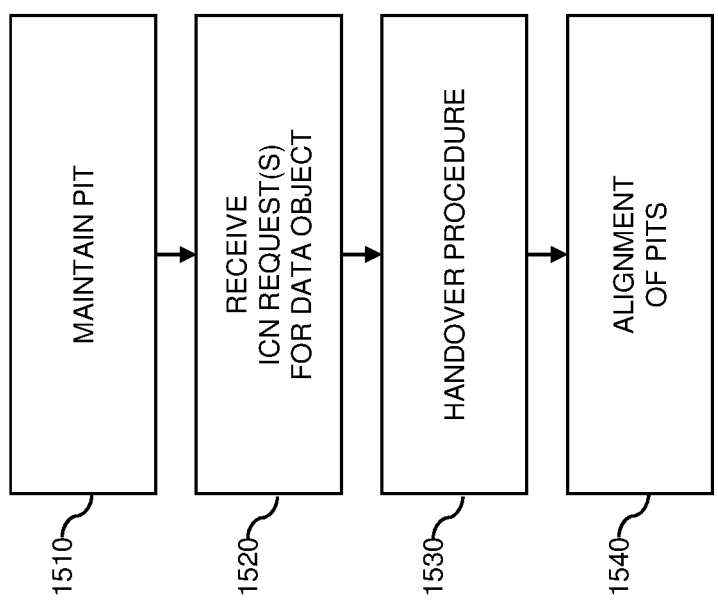
FIG. 15 shows a flowchart for schematically illustrating a method performed by a local gateway according to an embodiment of the invention, the local gateway being associated with a target access node of a handover.

FIG. 15 shows a flowchart for illustrating a method of conveying data in a cellular network. The method of FIG. 15 may be utilized for implementing the illustrated concepts in a local gateway of the cellular network, which is associated with an access node acting as a target node in mobility of a UE, such as the above-mentioned target LGW 31 which is associated with the target eNB 21. The local gateway may be collocated with the access node or otherwise be arranged close to the access node. For example, the local gateway may be included together with the access node in a RAN part of the cellular network. If a processor-based implementation of the local gateway is used, the steps of the method may be performed by one or more processors of the local gateway. In such a case the local gateway may further comprise a memory in which program code for implementing the below described functionalities is stored.

The local gateway may be selected by the access node. Examples of procedures in which the target local gateway is selected by the target access node are shown in FIGS. 6 to 8, where the target eNB 21 may select the target LGW 31. Alternatively, the local gateway may be selected by a mobility control node associated with the access node, e.g., by an MME. An example of procedures in which the target local gateway is selected by a mobility control node is shown in FIG. 9, where the MME 40 selects the target LGW 31.

At step 1510, the local gateway (target local gateway) maintains a PIT (source PIT). The PIT includes an entry for each data object having a pending ICN request at the local gateway.

At optional step 1520, the local gateway may receive one or more ICN requests for one or more data objects. Such ICN requests may be received from the access node the local gateway is associated with and originate from one or more UEs in a coverage area of the access node. In accordance with ICN principles, such ICN request identifies the data object by a name and is not addressed to a specific source of the data object. The ICN request may for example be an Interest message according to the CCNx specifications. Based on the received ICN request, the local gateway may update the PIT.

At step 1530, a certain UE moves from a coverage area of a further access node (source access node) to the coverage area of the access node. The further access node is associated with a further local gateway (source local gateway). The further local gateway may be collocated with the further access node or otherwise be arranged close to the further access node. For example, the further local gateway may be included together with the further access node in a RAN part of the cellular network. In response to the movement of the UE, a handover procedure of the UE from the further access node to the access node is performed. An example of such further access node and further local gateway is given by the above-mentioned source eNB 20 and source LGW 30. The further local gateway maintains a further PIT (source PIT). The further PIT includes an entry for each data object having a pending ICN request at the further local gateway, e.g., an ICN request from the UE which is handed over. The handover procedure may be based on interaction of the access node and the further access node, as for example illustrated in FIGS. 6 to 9. The handover procedure may include a handover preparation phase, a handover execution phase, and a handover completion phase.

At step 1540, the local gateway performs alignment of the PIT and the further PIT with respect to at least one entry associated with the UE. This alignment of the PIT and the further PIT is initiated by the handover procedure of step 1430. For example, the handover procedure may be used for setting up a connection between the local gateway and the further local gateway, and this connection may then be used for conveying information for aligning the PITs. The connection may include the above-mentioned direct tunnel between eNB and LGW and/or a tunnel between source local gateway and target local gateway, e.g., extending via the source access node and the target access node. The conveyed information may for example include one or more PIT entries removed from the source PIT and to be included into the target PIT. Accordingly, the alignment of the PIT and the further PIT may involve deleting at least one entry associated with the UE from the source PIT. In addition or as an alternative, wherein the alignment of the PIT and the further PIT may involve copying at least one entry associated with the UE from the source PIT to the target PIT. Further, the alignment of the PIT and the further PIT may involve updating at least one entry of the target PIT with information from at least one entry of the source PIT associated with the UE. Further, the alignment of the PIT and the further PIT may involve transmission of information on at least one entry of the PIT and/or of the further PIT (e.g., transmission of one or more PIT entries or UE context information associated with such PIT entries. For example, such information may be transmitted via the above-mentioned direct tunnel and/or a temporary connection between source access node and target access node. Further, the information could be piggybacked, i.e., inserted into one or messages of the handover procedure, such as shown in the example of FIG. 9. The source local gateway may send the information and the target local gateway may receive the information. The alignment of the PIT and the further PIT may be based on identifying the target local gateway based on a tunnel identifier assigned during the handover procedure, e.g., an S5 TEID. This tunnel identifier may for example be used for setting up the direct tunnel between the local gateway and the further local gateway.

It is noted that the methods of FIGS. 14 and 15 may also be combined. For example, the methods may be combined in a system which includes, at least, a source local gateway operating according to the method of FIG. 14 and a target local gateway operating according to FIG. 15. Further, the methods may also be combined in the same local gateway which acts as a source local gateway in a first handover and acts as a target local gateway in a second handover.

Further, it is noted that the methods of FIGS. 11, 12, 14, and 15 may be combined in a system which includes, at least, a source access node operating according to the method of FIG. 11, a target access node operating according to FIG. 12, a source local gateway operating according to the method of FIG. 14, and a target local gateway operating according to FIG. 15. Further, the methods may also be combined in a system including an access node and a local gateway associated with the access node. In such system the access node could act as a source access node according to the method of FIG. 11 in a first handover and as a target access node according to the method of FIG. 12 in a second handover, while the local gateway could act as a source local gateway according to the method of FIG. 14 in the first handover and as a target local gateway according to the method of FIG. 15 in the second handover.

Figure 16:
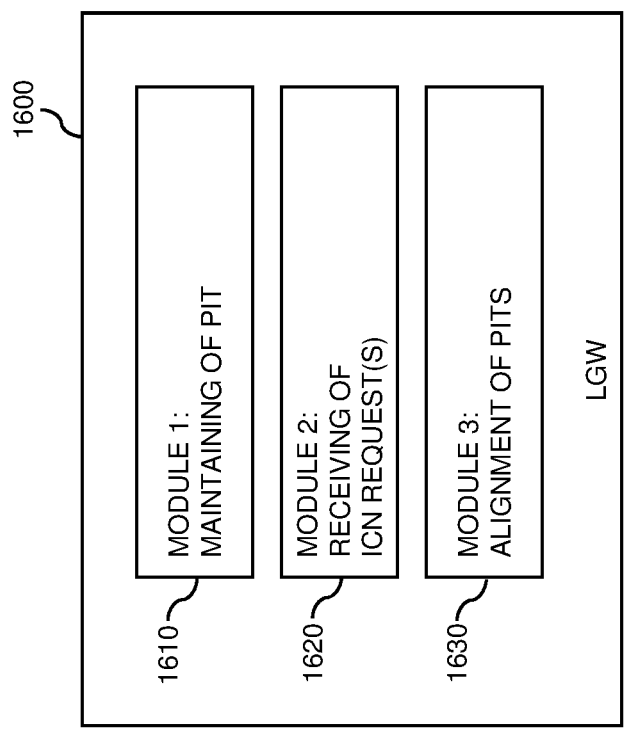
FIG. 16 shows a block diagram for illustrating functionalities of a local gateway according to an embodiment of the invention.

FIG. 16 shows a block diagram for illustrating functionalities of a local gateway 1600 which operates according to the method of FIG. 14 and/or according to the method of FIG. 15. As illustrated, the local gateway 1600 may be provided with a module 1610 configured to maintain a PIT, such as explained in connection with step 1410 and/or step 1510. Further, the local gateway 1600 may be provided with a module 1620 configured to receive one or more ICN request, such as explained in connection with step 1420 and/or step 1520. Further, the local gateway 1600 may be provided with a module 1630 configured to, initiated by a handover procedure such as explained in connection with step 1430 or 1530, perform alignment of PITs, such as explained in connection with step 1440 and/or 1540.

It is noted that the local gateway 1600 may include further modules for implementing other functionalities, such as known functionalities of an LGW. Further, it is noted that the modules of the local gateway 1600 do not necessarily represent a hardware structure of the local gateway 1600, but may also correspond to functional elements, e.g., implemented by hardware, software, or a combination thereof.

Figure 17:
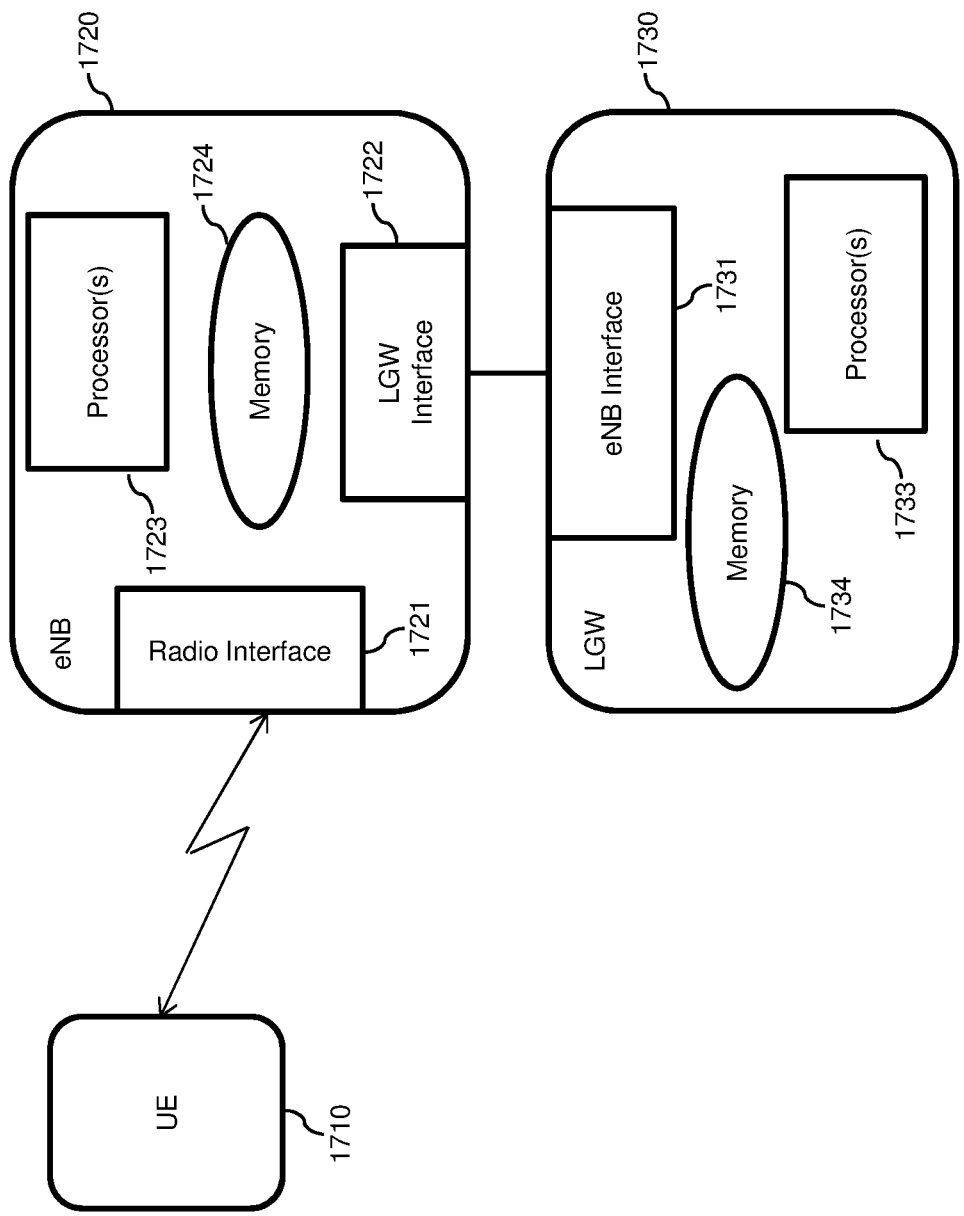
FIG. 17 schematically illustrates structures of devices according to embodiments of the invention.

FIG. 17 illustrates a UE 1710, an access node 1720, assumed as an eNB, and an LGW 1730, which may be used in the concepts as explained above. Specifically, FIG. 17 shows processor-based implementations of the eNB 1720 and of the LGW 1730.

As illustrated, the eNB 1720 includes a radio interface 1721 for connection to the UE 1710, an LGW interface 1722 for connection to the LGW 1630, one or more processors 1723, and a memory 1724. The eNB 1720 may correspond to an access node operating according to the method of FIGS. 11 and/or 12, such the above-mentioned source eNB 20 or target eNB 21. The interfaces 1721, 1722 the processor(s) 1723, and the memory 1724 may be coupled to each other by one or more internal bus systems of the eNB 1720. The memory 1724 may include a ROM (Read Only Memory), e.g., a flash ROM, a RAM (Random Access Memory), e.g., a DRAM (Dynamic RAM) or SRAM (Static RAM), a mass storage, e.g., a hard disk or solid state disk, or the like. The memory 1724 may include suitably configured program code to be executed by the processor(s) 1723 so as to implement the above-described functionalities of an access node, such as explained in connection with FIGS. 11 and/or 12.

As further illustrated, the LGW 1730 includes an eNB interface 1732 for connection to the eNB 1720, one or more processors 1733, and a memory 1734. The LGW 1730 may correspond to an LGW operating according to the method of FIG. 14 or 15, such as the above-mentioned source LGW 30 or target LGW 31. The interface 1731, the processor(s) 1733, and the memory 1724 may be coupled by one or more internal bus systems of the LGW 1730. The memory 1734 may include a ROM, e.g., a flash ROM, a RAM, e.g., a DRAM or SRAM, a mass storage, e.g., a hard disk or solid state disk, or the like. The memory 1734 may include suitably configured program code to be executed by the processor(s) 1733 so as to implement the above-described functionalities of an LGW, such as explained in connection with FIGS. 14 and/or 15.

It is to be understood that the structures as illustrated in FIG. 17 are merely schematic and that the eNB 1720 or the LGW 1730 may actually include further components which, for the sake of clarity, have not been illustrated, e.g., further interfaces or processors. Also, it is to be understood that in each case the memory may include further program code for implementing known functionalities of an eNB or LGW, respectively. According to some embodiments, also a computer program may be provided for implementing functionalities of the eNB 1720 or the LGW 1730, e.g., in the form of a physical medium storing the program code and/or other data to be stored in the memory 1724, 1734 or by making the program code available for download or by streaming.

Accordingly, the present disclosure provides the following exemplary embodiments:

According to an embodiment, a method in a system is provided. The system comprises a UE which moves from the coverage area of a source eNB into the coverage area of a target eNB. The source eNB hands over the UE to the target eNB. The source eNB is connected to a source LGW having a source PIT. The target eNB is connected to a target LGW having a target PIT. The UE sends a request for content to a ICN/CCN network prior to handover of the UE. For the request, an entry is made in the source PIT. During the handover, the source PIT being aligned with the target PIT.

According to a further embodiment, a method performed by a source LGW having a source PIT is provided. The method comprises removing an entry in the source PIT after receiving a release resource message or a delete session message.

According to a further embodiment, a method performed by a target LGW having a target PIT is provided. The method comprises requesting PIT entries from a source LGW, receiving PIT entries from the source LGW and using received PIT entries to update the target PIT.

According to a further embodiment, a method performed by a target eNB connected to a UE that moved into its coverage area is provided. According to the method, the eNB selects an LGW to be used for that UE.

According to a further embodiment, a system is disclosed. The system comprises a UE moving from the coverage area of a source eNB into the coverage area of a target eNB. The source eNB hands over the UE to the target eNB. The source eNB is connected to a source LGW having a source PIT, and the target eNB is connected to a target LGW having a target PIT. The UE is adapted to send a request for content to a ICN/CCN network prior to handover of the UE. For the request, an entry is made in the source PIT. During the handover, the source PIT is adapted to be aligned with the target PIT. The system is adapted to perform a method according to one or more embodiments described above.

According to a further embodiment, a source LGW having a source PIT is provided. The source LGW is adapted to remove an entry in the source PIT after receipt a release resource message or delete session message. The source LGW is adapted to perform a method according to one or more embodiments described above.

According to a further embodiment, a target LGW having a target PIT is provided. The target LGW is adapted to request PIT entries from a source LGW, receive PIT entries from the source LGW and use received PIT entries to update the target PIT. the target LGW is adapted to perform a method according to one or more embodiments described above.

According to a further embodiment, a target eNB connected a UE that moved into its coverage area is provided. The eNB is adapted to select an LGW to be used for that UE. The target eNB is adapted to perform a method according to one or more embodiments described above.

In further embodiments, the target eNB, the source eNB, the source LGW, or the target LGW may also be referred as a network node. The network node may comprise processing means, for example at least on processor and a memory. The memory may comprise instructions to be executed by the at least one processor, whereby the network node is adapted to one or more embodiments of the above described methods. The node may further comprise at least one interface for communicating with a respective peer entity.

As can be seen, the concepts as described above may be used for efficiently conveying data in a cellular network. For example, the concepts may be used for enhancing the cellular network with ICN capabilities and efficiently taking into account mobility of UEs. Specifically, ICN enhancements may be introduced locally in the cellular network, at or in close proximity to access nodes of the cellular network.

It is to be understood that the examples and embodiments as explained above are merely illustrative and susceptible to various modifications. For example, the illustrated concepts may be applied in connection with various kinds of cellular network technologies, without limitation to the LTE technology. Further, the illustrated concepts may be applied in connection with various kinds of ICN technologies, without limitation to CCN or NDN. Further, the concepts may be applied in connection with various kinds of handover procedures, also including handovers with relocation of the SGW or relocation of the MME. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method of conveying data in a cellular network, the method comprising:
   an access node of the cellular network receiving, from a user equipment, at least one information-centric networking request for a data object;
   the access node forwarding the at least one information-centric networking request to a local gateway associated with the access node;
   the local gateway maintaining a pending interest table comprising an entry for each data object having a pending information-centric networking request at the local gateway; and
   in response to the user equipment moving from a coverage area of the access node to a coverage area of an additional access node, the access node performing a handover procedure, wherein the additional access node is associated with a further local gateway maintaining a further pending interest table comprising an entry for each data object having a pending information-centric networking request at the further local gateway, wherein the handover procedure initiates alignment of the pending interest table and the further pending interest table with respect to at least one entry associated with the user equipment and comprises setting up a connection between the local gateway and the further local gateway, the connection extending via the access node and the additional access node, and wherein an X2 interface is used between the access node and the additional access node, and being used by the access node for conveying information for the alignment of the pending interest table and the further pending interest table.

2. The method of claim 1, wherein the alignment of the pending interest table and the further pending interest table comprises deleting at least one entry associated with the user equipment from the pending interest table.

3. The method of claim 1, wherein the alignment of the pending interest table and the further pending interest table comprises copying at least one entry associated with the user equipment from the pending interest table to the further pending interest table.

4. The method of claim 1, wherein the alignment of the pending interest table and the further pending interest table comprises updating at least one entry of the further pending interest table with information from at least one entry of the pending interest table associated with the user equipment.

5. The method of claim 1, wherein the alignment of the pending interest table and the further pending interest table comprises transmission of information on at least one entry of the pending interest table and/or of the pending interest table.

6. The method of claim 1, wherein the alignment of the pending interest table and the further pending interest table based on identifying the further local gateway based on a tunnel identifier assigned during the handover procedure.

7. A method of conveying data in a cellular network, the method comprising: a local gateway associated with an access node of the cellular network maintaining a pending interest table comprising an entry for each data object having a pending information-centric networking request at the local gateway; the local gateway receiving, from the access node, at least one information-centric networking request of a user equipment for a data object; and in response to the user equipment moving from a coverage area of the access node to a coverage area of a further an additional access node, associated with a further local gateway maintaining a further pending interest table comprising an entry for each data object having a pending information-centric networking request at the further local gateway, the local gateway performing alignment of the pending interest table and the further pending interest table with respect to at least one entry associated with the user equipment, wherein the alignment of the pending interest table and the further pending interest table is initiated by a handover procedure of the user equipment from the access node to the further additional access node, wherein the handover procedure comprises setting up a connection between the local gateway and the further local gateway, the connection extending via the access node and the additional access node, and wherein an X2 interface is used between the access node and the additional access node, and being used by the access node for conveying information for the alignment of the pending interest table and the further pending interest table.

8. The method of claim 7, wherein the alignment of the pending interest table and the further pending interest table comprises deleting at least one entry associated with the user equipment from the pending interest table.

9. The method of claim 7, wherein the alignment of the pending interest table and the further pending interest table comprises copying at least one entry associated with the user equipment from the pending interest table to the further pending interest table.

10. The method of claim 7, wherein the alignment of the pending interest table and the further pending interest table comprises updating at least one entry of the further pending interest table with information from at least one entry of the pending interest table associated with the user equipment.

11. The method of claim 7, wherein the alignment of the pending interest table and the further pending interest table comprises transmission of information on at least one entry of the pending interest table and/or of the pending interest table.

12. The method of claim 7, wherein the alignment of the pending interest table and the further pending interest table is based on identifying the further local gateway based on a tunnel identifier assigned during the handover procedure.

13. A method of conveying data in a cellular network, the method comprising: in response to a user equipment moving to a coverage area of an access node of the cellular network from a coverage area of a further an additional access node of the cellular network, the access node performing a handover procedure of the user equipment from the further additional access node to the access node; wherein the access node is associated with a local gateway maintaining a pending interest table comprising an entry for each data object having a pending information-centric networking request at the local gateway, wherein the further additional access node is associated with a further local gateway maintaining a further pending interest table comprising an entry for each data object having a pending information-centric networking request at the further local gateway, wherein the handover procedure initiates alignment of the pending interest table and the further pending interest table with respect to at least one entry associated with the user equipment and comprises setting up a connection between the local gateway and the further local gateway, the connection extending via the access node and the additional access node, and wherein an X2 interface is used between the access node and the additional access node, and being used by the access node for conveying information for the alignment of the pending interest table and the further pending interest table.

14. The method of claim 13, wherein the alignment of the pending interest table and the further pending interest table comprises deleting at least one entry associated with the user equipment from the further pending interest table.

15. The method of claim 13, wherein the alignment of the pending interest table and the further pending interest table comprises copying at least one entry associated with the user equipment from the further pending interest table to the pending interest table.

16. The method of claim 13, wherein the alignment of the pending interest table and the further pending interest table comprises updating at least one entry of the pending interest table with information from at least one entry of the further pending interest table associated with the user equipment.

17. The method of claim 13, wherein the alignment of the pending interest table and the further pending interest table comprises transmission of information on at least one entry of the pending interest table and/or of the pending interest table.

18. The method of claim 13, wherein the alignment of the pending interest table and the further pending interest table is based on identifying the local gateway based on a tunnel identifier assigned during the handover procedure.

19. The method of claim 13, wherein the local gateway is selected by the access node.

20. The method of claim 13, wherein the local gateway is selected by a mobility control node associated with the access node.

21. A method of conveying data in a cellular network, the method comprising: a local gateway associated with an access node of the cellular network maintaining a pending interest table comprising an entry for each data object having a pending information-centric networking request at the local gateway; and in response to a user equipment moving from a coverage area of a further an additional access node of the cellular network to a coverage area of the access node, the further additional access node being associated with a further local gateway maintaining a further pending interest table comprising an entry for each data object having a pending information-centric networking request at the further local gateway, the local gateway performing alignment of the pending interest table and the further pending interest table with respect to at least one entry associated with the user equipment, wherein the alignment of the pending interest table and the further pending interest table is initiated by a handover procedure of the user equipment from the further additional access node to the access node, wherein the handover procedure comprises setting up a connection between the local gateway and the further local gateway, the connection extending via the access node and the additional access node, and wherein an X2 interface is used between the access node and the additional access node, and being used by the access node for conveying information for the alignment of the pending interest table and the further pending interest table.

22. The method of claim 21, wherein the alignment of the pending interest table and the further pending interest table comprises deleting at least one entry associated with the user equipment from the further pending interest table.

23. The method of claim 21, wherein the alignment of the pending interest table and the further pending interest table comprises copying at least one entry associated with the user equipment from the further pending interest table to the pending interest table.

24. The method of claim 21, wherein the alignment of the pending interest table and the further pending interest table comprises updating at least one entry of the pending interest table with information from at least one entry of the further pending interest table associated with the user equipment.

25. The method of claim 21, wherein the alignment of the pending interest table and the further pending interest table comprises transmission of information on at least one entry of the pending interest table and/or of the pending interest table.

26. The method of claim 21, wherein the alignment of the pending interest table and the further pending interest table is based on identifying the local gateway based on a tunnel identifier assigned during the handover procedure.

27. An access node for a cellular network, the access node comprising: radio interface circuitry configured to communicate with a user equipment; interface circuitry configured for communication with at least a local gateway associated with the access node; and processing circuitry configured to: receive from a user equipment, via the radio interface circuitry, at least one information-centric networking request for a data object; forward the at least one information-centric networking request to the local gateway, via the interface circuitry, the local gateway maintaining a pending interest table comprising an entry for each data object having a pending information-centric networking request at the local gateway; and in response to the user equipment moving from a coverage area of the access node to a coverage area of a further an additional access node, perform a handover procedure, wherein the further additional access node is associated with a further local gateway maintaining a further pending interest table comprising an entry for each data object having a pending information-centric networking request at the further local gateway, wherein the handover procedure initiates alignment of the pending interest table and the further pending interest table with respect to at least one entry associated with the user equipment and comprises setting up a connection between the local gateway and the further local gateway, the connection extending via the access node and the additional access node, and wherein an X2 interface is used between the access node and the additional access node, and being used by the access node for conveying information for the alignment of the pending interest table and the further pending interest table.

28. The access node of claim 27, wherein the alignment of the pending interest table and the further pending interest table comprises deleting at least one entry associated with the user equipment from the pending interest table.

29. The access node of claim 27, wherein the alignment of the pending interest table and the further pending interest table comprises copying at least one entry associated with the user equipment from the pending interest table to the further pending interest table.

30. The access node of claim 27, wherein the alignment of the pending interest table and the further pending interest table comprises updating at least one entry of the further pending interest table with information from at least one entry of the pending interest table associated with the user equipment.

31. The access node of claim 27, wherein the alignment of the pending interest table and the further pending interest table is based on identifying the further local gateway based on a tunnel identifier assigned during the handover procedure.

32. The access node of claim 27, wherein the alignment of the pending interest table and the further pending interest table comprises transmission of information on at least one entry of the pending interest table and/or of the pending interest table.

33. A local gateway for association with an access node of a cellular network, the local gateway comprising: interface circuitry configured to communicate with the access node; and processing circuitry configured to: maintain a pending interest table comprising an entry for each data object having a pending information-centric networking request at the local gateway; receive from the access node, via the interface circuitry, at least one information-centric networking request of a user equipment for a data object; and in response to the user equipment moving from a coverage area of the access node to a coverage area of a further an additional access node, associated with a further local gateway maintaining a further pending interest table comprising an entry for each data object having a pending information-centric networking request at the further local gateway, perform alignment of the pending interest table and the further pending interest table with respect to at least one entry associated with the user equipment, wherein the alignment of the further pending interest table with the pending interest table is initiated by a handover procedure of the user equipment from the access node to the further additional access node, wherein the handover procedure comprises setting up a connection between the local gateway and the further local gateway, the connection extending via the access node and the additional access node, and wherein an X2 interface is used between the access node and the additional access node, and being used by the access node for conveying information for the alignment of the pending interest table and the further pending interest table.

34. The local gateway of claim 33, wherein the alignment of the pending interest table and the further pending interest table comprises deleting at least one entry associated with the user equipment from the pending interest table.

35. The local gateway of claim 33, wherein the alignment of the pending interest table and the further pending interest table comprises copying at least one entry associated with the user equipment from the pending interest table to the further pending interest table.

36. The local gateway of claim 33, wherein the alignment of the pending interest table and the further pending interest table comprises updating at least one entry of the further pending interest table with information from at least one entry of the pending interest table associated with the user equipment.

37. The local gateway of claim 33, wherein the alignment of the pending interest table and the further pending interest table is based on identifying the further local gateway based on a tunnel identifier assigned during the handover procedure.

38. The local gateway of claim 33, wherein the alignment of the pending interest table and the further pending interest table comprises transmission of information on at least one entry of the pending interest table and/or of the pending interest table.

39. A local gateway for association with an access node of a cellular network, the local gateway comprising: interface circuitry configured to communicate with the access node; and processing circuitry configured to: maintain a pending interest table comprising an entry for each data object having a pending information-centric networking request at the local gateway; and in response to a user equipment moving from a coverage area of a further an additional access node of the cellular network to a coverage area of the access node, the further additional access node being associated with a further local gateway maintaining a further pending interest table comprising an entry for each data object having a pending information-centric networking request at the further local gateway, perform alignment of the pending interest table and the further pending interest table with respect to at least one entry associated with the user equipment, wherein the alignment of the pending interest table and the further pending interest table is initiated by a handover procedure of the user equipment from the further additional access node to the access node, wherein the handover procedure comprises setting up a connection between the local gateway and the further local gateway, the connection extending via the access node and the additional access node, and wherein an X2 interface is used between the access node and the additional access node, and being used by the access node for conveying information for the alignment of the pending interest table and the further pending interest table.

40. The local gateway of claim 39, wherein the alignment of the pending interest table and the further pending interest table comprises deleting at least one entry associated with the user equipment from the pending interest table.

41. The local gateway of claim 39, wherein the alignment of the pending interest table and the further pending interest table comprises copying at least one entry associated with the user equipment from the further pending interest table to the pending interest table.

42. The local gateway of claim 39, wherein the alignment of the pending interest table and the further pending interest table comprises updating at least one entry of the pending interest table with information from at least one entry of the further pending interest table associated with the user equipment.

43. The local gateway of claim 39, wherein the alignment of the pending interest table and the further pending interest table is based on identifying the local gateway based on a tunnel identifier assigned during the handover procedure.

44. The local gateway of claim 39, wherein the alignment of the pending interest table and the further pending interest table comprises transmission of information on at least one entry of the pending interest table and/or of the pending interest table.

\* \* \* \* \*